(12) United States Patent
Qian et al.

(10) Patent No.: US 6,810,341 B2
(45) Date of Patent: Oct. 26, 2004

(54) TIME VARYING HARMONIC ANALYSIS INCLUDING DETERMINATION OF ORDER COMPONENTS

(75) Inventors: Shie Qian, Austin, TX (US); Hui Shao, Shanghai (CN); Nanxiong Zhang, Shanghai (CN)

(73) Assignee: National Instruments Corporation, Austin, TX (US)

( * ) Notice: Subject to any disclaimer, the term of this patent is extended or adjusted under 35 U.S.C. 154(b) by 165 days.

(21) Appl. No.: 10/180,765

(22) Filed: Jun. 26, 2002

(65) Prior Publication Data

US 2002/0183948 A1 Dec. 5, 2002

Related U.S. Application Data

(63) Continuation-in-part of application No. 09/974,379, filed on Oct. 9, 2001, now Pat. No. 6,477,472, which is a division of application No. 09/636,097, filed on Aug. 10, 2000, now Pat. No. 6,366,862, which is a continuation-in-part of application No. 09/551,924, filed on Apr. 19, 2000, now Pat. No. 6,332,116.

(51) Int. Cl.[7] .................................................. G01B 5/30
(52) U.S. Cl. ............................ 702/75; 702/76; 702/77; 702/78; 702/79; 702/105; 702/182; 702/183
(58) Field of Search .............................. 702/54, 56, 66, 702/75–79, 103, 105, 106, 113–115, 12, 182–185, 188, 189, FOR 107–108, FOR 110, FOR 123–126, FOR 134–136, FOR 168, FOR 170–171, 33–36, 44; 700/279–280; 708/400, 401; 73/659, 660, 579, 583, 593, 609, 559, 600; 340/681, 682, 683; 324/207, 251, 226

(56) References Cited

U.S. PATENT DOCUMENTS

426,641 A    4/1890  Kurihara et al.
4,599,567 A  7/1986  Goupillaud et al.
4,667,297 A  5/1987  Kawai (List continued on next page.)

FOREIGN PATENT DOCUMENTS

JP    03205571 A  *  9/1991   ........... G01R/23/16

OTHER PUBLICATIONS

"Order Analysis," Realtime Update, Fall 1996–Winter 1997, Hewlett–Packard, p. 1.

(List continued on next page.)

*Primary Examiner*—Marc S. Hoff
*Assistant Examiner*—Carol S. Tsai
(74) *Attorney, Agent, or Firm*—Meyertons Hood Kivlin Kowert & Goetzel, P.C.; Jeffrey C. Hood; Jason L. Burgess

(57) ABSTRACT

A system and method for analyzing order components present in a physical signal X acquired from a physical system. Measurement information for the physical signal X may be received, where the measurement information includes information indicating a plurality of order components of the physical signal X. Time frequency plot information visually indicating order components of the physical signal X may be displayed. User input selecting one or more of the visually indicated order components may be received. A time domain signal may be created based on the one or more selected order components and may then be presented to a user on a presentation device. Presenting the time domain signal on the presentation device may enable the user to analyze the physical signal X or the physical system. Where the physical system includes one or more rotating elements, the method may enable order components of the signal to be analyzed even when no rotation speed information (e.g., tachometer information) for the rotating element is available.

56 Claims, 11 Drawing Sheets

U.S. PATENT DOCUMENTS

| | | | |
|---|---|---|---|
| 4,912,661 A | 3/1990 | Potter | |
| 4,961,364 A | 10/1990 | Tsutsumi et al. | |
| 5,353,233 A | 10/1994 | Oian et al. | |
| 5,365,787 A | 11/1994 | Hernandez et al. | |
| 5,404,377 A | 4/1995 | Moses | |
| 5,439,483 A | 8/1995 | Duong-Van | |
| 5,471,880 A * | 12/1995 | Lang et al. | 73/660 |
| 5,473,555 A | 12/1995 | Potter | |
| 5,486,833 A | 1/1996 | Barrett | |
| 5,566,092 A | 10/1996 | Wang et al. | |
| 5,594,175 A | 1/1997 | Lyon et al. | |
| 5,686,669 A | 11/1997 | Hernandez et al. | |
| 5,717,141 A | 2/1998 | Kikuchi et al. | |
| 5,729,694 A | 3/1998 | Holzrichter et al. | |
| H1720 H | 4/1998 | Chen | |
| 5,744,723 A | 4/1998 | Piety | |
| H1726 H | 5/1998 | Chen | |
| 5,776,063 A | 7/1998 | Dittrich et al. | |
| 5,784,273 A | 7/1998 | Madhaven | |
| 5,825,657 A | 10/1998 | Hernandez | |
| 5,845,241 A | 12/1998 | Owechko | |
| 5,852,567 A | 12/1998 | Xia et al. | |
| 5,854,993 A | 12/1998 | Grichnik | |
| 5,903,819 A | 5/1999 | Romesburg | |
| 5,955,674 A | 9/1999 | McGovern et al. | |
| 5,960,373 A | 9/1999 | Fukuda et al. | |
| 5,995,868 A | 11/1999 | Dorfmeister et al. | |
| 5,995,910 A | 11/1999 | Discenzo | |
| 6,005,395 A * | 12/1999 | Chan et al. | 324/635 |
| 6,011,816 A | 1/2000 | Sanielevici et al. | |
| 6,036,653 A | 3/2000 | Baba et al. | |
| 6,041,287 A | 3/2000 | Dister et al. | |
| 6,057,924 A | 5/2000 | Ross et al. | |
| 6,128,959 A | 10/2000 | McGovern et al. | |
| 6,131,013 A | 10/2000 | Bergstrom et al. | |
| 6,157,899 A | 12/2000 | Venkataraman et al. | |
| 6,208,944 B1 | 3/2001 | Franke et al. | |
| 6,301,572 B1 | 10/2001 | Harrison | |
| 6,324,487 B1 | 11/2001 | Qian et al. | |
| 6,332,116 B1 | 12/2001 | Qian et al. | |
| 6,351,714 B1 * | 2/2002 | Birchmeier | 702/56 |
| 6,366,862 B1 * | 4/2002 | Qian et al. | 702/35 |
| 6,408,696 B1 * | 6/2002 | Jong | 73/579 |
| 6,591,200 B1 * | 7/2003 | Cohen et al. | 702/38 |
| 2001/0054322 A1 * | 12/2001 | Sommerfeld et al. | 73/862.325 |

OTHER PUBLICATIONS

Technical Review No. I—1999, © Brüel & Kjaer Sound & Vibration Measurement A/S, "Characteristics of the Vold–Kalman Order Tracking Filter by S. Gade et al.," pp. 1–59.

Herlufsen et al., "Characteristics of the Vold/Kalman Order Tracking Filter," Sound & Vibration, Apr. 1999, pp. 2–8.

Vold et al., "Multi Axle Order Tracking with the Vold–Kalman Tracking Filter," Sound & Vibration, May 1997, pp. 30–34.

Gade et al., "Order Tracking Analysis," 1995, 47 pgs.

Product Data, Vold–Kalman Order Tracking Filter, 1998, pp. 1–7.

Product Data, Order Tracking Analyzer, 1995, pp. 1–7.

"Effective Machinery Measurements using Dynamic Signal Analyzers," Hewlett–Packard Co. 1997, pp. 3–84.

Roush Industries "Noise and Vibration Training Course for Test Engineers and Technicians", May 1999.

* cited by examiner

TIME VARYING HARMONIC ANALYSIS INCLUDING DETERMINATION OF ORDER COMPONENTS

CONTINUATION DATA

This application is a Continuation in Part of U.S. patent application Ser. No. 09/974,379 titled "Analyzing Signals Generated by Rotating Machines Using an Order Mask to Select Desired Order Components of the Signals," whose inventors are Shie Qian, Hui Shao, and Wei Jin, which was filed on Oct. 9, 2001; U.S. Pat. No. 6,477,472 which is a divisional of U.S. patent application Ser. No.09/636,097 titled "System and Method for Analyzing Signals Generated by Rotating Machines" whose inventors are Shie Qian, Hui Shao, and Wei Jin, which was filed on Aug. 10, 2000; U.S. Pat. No. 6,366,862 which is a Continuation in Part of U.S. patent application Ser. No. 09/551,924 titled "System and Method for Analyzing Signals of Rotating Machines" whose inventors are Shie Qian and Hui Shao, which was filed on Apr. 19, 2000 now U.S. Pat. No. 6,332,116.

FIELD OF THE INVENTION

The invention relates generally to signal analysis systems or test and measurement systems, and more particularly to a system and method for analyzing order components of a signal generated by a physical system, e.g., a mechanical system containing one or more rotating elements, without necessarily requiring use of a tachometer to indicate the rotation speed of the system.

DESCRIPTION OF THE RELATED ART

Scientists and engineers often use test and measurement systems and data acquisition systems to perform a variety of functions, including laboratory research, process monitoring and control, data logging, analytical chemistry, test and analysis of physical phenomena and analysis or control of mechanical or electrical machinery, to name a few examples. One example of hardware to implement such measuring systems is a computer-based measurement system or data acquisition (DAQ) system. Another example of a measurement system is a dedicated instrument, such as a dedicated oscilloscope or signal analyzer.

A measurement system typically may include transducers for measuring and/or providing electrical signals, signal conditioning hardware which may perform amplification, isolation and/or filtering, and measurement or DAQ hardware for receiving digital and analog signals and providing them to a processing system, such as a processor or personal computer. The computer-based measurement system or dedicated instrument may further include analysis hardware and software for analyzing and appropriately displaying the measured data.

One example where measurement and data acquisition systems are used is in the field of rotating machinery analysis. This involves the analysis of physical signals such as vibration or acoustic signals from a rotating machine. A physical signal acquired from a rotating machine may be sampled or digitized. Typically, samples of the physical signal are equidistant in time. However, rotating machines generate signals which are periodic with respect to shaft rotation, i.e., rotation angle of an underlying rotating element (e.g. a crank shaft of an engine). These rotation-periodic signals are referred to herein as order components. When the rotation rate changes in time, the order components change correspondingly in frequency. For example, when the rotation rate increases, the order components increase in frequency. Thus, a traditional analysis method such as the Discrete Fourier Transform (DFT), when applied to the physical signal, displays a frequency smearing of order components. The frequency smearing makes it very difficult to derive meaningful information about the order components. Thus, traditional signal analysis methods such as the Fourier Transform of the time domain input signal are not well suited for analyzing order components generated by rotating machines.

In order to better analyze the performance and characteristics of rotating machines, certain prior art systems convert the time-samples, i.e., the samples of the physical signal which are equally spaced in time, to angle-samples, i.e., samples which are equally spaced in shaft angle. For example, U.S. Pat. No. 4,912,661 assigned to Hewlett-Packard discloses an interpolation method for estimating angle-samples from time-samples. The method disclosed in U.S. Pat. No. 4,912,661 performs an interpolation of the time domain signal, followed by a decimation, in order to produce samples equally spaced with respect to shaft angle. The order components may then be analyzed by performing a traditional analysis method such as the Discrete Fourier Transform on the angle-samples. However, this method is expensive in terms of computational resources and may not be very accurate.

One prior art system known as the Vold-Kalman filter allows the user to track the frequency of an order component given a sufficiently accurate model, i.e., a stochastic model, for the physical signal. The Vold-Kalman filter performance may be strongly sensitive to model accuracy. In other words, the tracking performance is likely to be degraded when an inaccurate signal model is supplied to the filter. Furthermore, the Vold-Kalman filter provides no mechanism for the user to evaluate the accuracy of the frequency tracking for an order component.

Therefore, there exists a need for a system and method which can more accurately and robustly analyze order components of a physical signal, and reconstruct desired order components in the time-domain.

In some applications, such as engine diagnostics, a sensor, e.g., a tachometer may be utilized to track the fundamental frequency. This information may then be utilized to extract individual time-varying harmonics. However, for many applications, a tachometer signal is not available. For example, for sound recorded during takeoff or landing of an airplane or helicopter, there is generally no tachometer information available. As another example, for sounds generated by a human voice or whales, no tachometer information is available. Thus, it would be desirable to provide a system and method for performing time-varying harmonic analysis when no tachometer information is available.

SUMMARY

One embodiment of the present invention comprises a method for analyzing order components present in a physical signal X acquired from a physical system. Measurement information for the physical signal X may be received, where the measurement information includes information indicating a plurality of order components of the physical signal X. For example, where the physical system generates sound, the measurement information may include digitized samples of the sound.

The measurement information may be processed to create time frequency plot information for the physical signal X. In one embodiment, processing the measurement information may include performing an invertible joint time-frequency transform on the measurement information. The time frequency plot information may be displayed on a display device. The time frequency plot information may include a plurality of points visually indicating the order components of the physical signal X. For example, each order component may appear as an order curve on the display device.

User input selecting one or more of the visually indicated order components may be received. In various embodiments, the user input may be received in any of various ways. The user input may be received directly to the displayed time frequency plot information. For example, in one embodiment selecting each order component may include receiving user input selecting one or more points proximate to the order component, i.e., proximate to (or on) the corresponding order curve, as described in detail below. The actual order component may then be determined based on the one or more selected points proximate to the order component, as also described below.

A time domain signal may be created based on the one or more selected order components. In one embodiment, the one or more selected order components may be suppressed from the time domain signal. In another embodiment, the time domain signal may consist only of the one or more selected order components.

The time domain signal may then be presented to a user on a presentation device. Presenting the time domain signal on the presentation device may enable the user to analyze the physical signal X or the physical system. For example, where the physical signal X is an audio signal and the selected order components were suppressed from the time domain signal, presenting the time domain signal on the presentation device may allow the user to listen to the sound generated by the physical system without the sound corresponding to the selected order components.

The method described above may be employed to analyze any of various types of physical signals acquired from any of various types of physical systems. In one embodiment, the physical system may include a rotating element. The method may enable order components of the signal to be analyzed even when no rotation speed information (e.g., tachometer information) for the rotating element is available. A more detailed description of one embodiment of the method described above follows.

According to one embodiment of the method, a signal analysis system may perform an invertible joint time-frequency transform on a sampled signal X to produce a first array (i.e., an initial array) of transform coefficients which depend on time and frequency. The joint time-frequency transform is preferably invertible, meaning that an arbitrary input signal may be recovered (or recovered up to numerical computation error) from its array of transform coefficients by applying a corresponding inverse transform to the transform array.

The signal analysis system may display a visual representation of the first array of coefficients produced by the invertible joint time-frequency transform. In one embodiment, the visual representation comprises a TF transform magnitude plot. The visual representation may allow the user to identify order components present in the input signal. The various order components may appear as order curves within the visual representation.

User input selecting a plurality of points indicating an estimated trajectory of an order component of interest may be received to the displayed visual representation. The order component of interest may be an order component that the user desires to extract from the signal X. The user may select any desired order component, including but not limited to the fundamental order component (i.e. the order component of order one).

The user may select the order component of interest by interacting directly with the visual representation. For example, the user may utilize an input device (such as a mouse, trackball, touchpad, pen device, keyboard, etc.) to select points proximate to the desired order curve, e.g., by using the input device to position a cursor at the desired points and selecting each point (e.g., by clicking a button of the mouse or performing a suitable selection action for another type of input device). In addition to selecting the desired points by positioning a cursor, in other embodiments, the points may be selected in any of various other ways. For example, in one embodiment the signal analysis system may provide adjustable cross hairs for the user to indicate particular positions within the displayed visual representation. The user may thus position vertical and horizontal cross hairs with an input device (such as by dragging with a mouse) until the cross hairs intersect at a point on a desired order curve. In another embodiment, the user may select the order component of interest without explicitly selecting individual points. For example, the user may use a pointing device to drag a cursor or trace a path along an order curve within the visual representation to indicate the desired order component.

The selected points may together approximate the order component. For example, line segments connecting the points may be automatically drawn, or a curve connecting the points may be automatically drawn, e.g., a curve computed using a curve-fitting algorithm (e.g., a spline curve algorithm) to fit a curve to the points. The resulting line segments or computed curve may appear to follow the order component curve in the displayed visual representation. The connected line segments or computed curve may thus be referred to as an estimated trajectory of the order component. In an embodiment in which the user traces a path through the visual representation, the specified path may be referred to as the estimated trajectory of the order component.

The signal analysis system may operate to refine the estimated trajectory to compute a more accurate trajectory of the order component of interest. For example, the points that the user selected may not be accurate enough, or there may not be a sufficient number of points, to identify the actual trajectory of the order component. The estimated trajectory defined by the user-selected points or path may be utilized to determine the actual trajectory (or a more accurate trajectory) of the order component.

In one embodiment, this may be done by first determining a band of points from the first array of coefficients proximate to the estimated trajectory of the order component. The band may be determined by widening the line segments or curve composing the estimated trajectory. The signal analysis system may then operate to compute coefficient positions having peak intensity values within the band. The computed peak coefficient positions may define the actual trajectory or a more accurate trajectory of the order component. Thus, the actual trajectory or the more accurate trajectory of the order component may include points proximate to the estimated trajectory based on the user-selected points or path, i.e., may include those points within the band having (local) peak intensity values. This may enable a more accurate representation of the order component.

The signal analysis system may then generate a modified array (i.e., a second array) of coefficients from the first array of coefficients. The signal analysis system may generate the modified array of coefficients by selecting a subset of coefficient positions (i.e., time-frequency index positions) from the first array, setting coefficients of the modified array equal to zero outside the subset and equal to the corresponding coefficients of the first array on the subset. The subset of coefficient positions may correspond to the order component of interest selected by the user.

The signal analysis system may generate an order mask array based on the more accurate trajectory of the order component. The order mask array may comprise an array of coefficients similar in structure to the first array generated by the joint time-frequency transform. The signal analysis system may generate the mask array so that coefficients in a time-frequency neighborhood of the selected order curve(s) are set to one, and coefficients outside the neighborhood may be set to zero. Thus the "one" values in the order mask array select the subset of desired coefficients, while the "zero" values mask out other non-desired coefficients. The desired coefficients correspond to the order component selected by the user.

The signal analysis system may use the subset of coefficient positions to generate the modified array of coefficients (i.e., the second array) from the first array. For example, the signal analysis system may multiply the mask array by the first array to generate the modified array of coefficients. Coefficients of the modified array may be equal to corresponding coefficients of the first array in the time-frequency neighborhood of the desired order curve(s), and may equal zero otherwise. Thus, the mask array may serve to pick out a particular subset of coefficients from the first array which are desired to be analyzed and to suppress (i.e., to set to zero) the coefficients outside the particular subset. The act of suppressing coefficients is also referred to herein as "removing" or "eliminating" the coefficients.

The signal analysis system may generate (i.e., compute) a time domain signal Y from the modified array of coefficients, i.e., from the subset of coefficients remaining after the masking operation. The signal analysis system may generate the time domain signal Y by performing an inverse joint time-frequency transform on the modified array of coefficients. The inverse joint time-frequency transform may be the inverse of the forward transform previously applied.

The time-domain signal Y may represent the behavior in time of the desired order component(s) selected by the user. The signal analysis system may transmit the time domain signal Y to a signal presentation device for presentation to a user.

In another embodiment, the signal analysis system may support indirect selection of the one or more desired order components to be extracted (i.e. analyzed). In the indirect selection mode, the user may specify one or more order components to be suppressed (i.e., removed) from the input signal. For example, the user may provide input to the visual representation of the first array of coefficients to designate points on or proximate to each of the order component curves which are to be suppressed.

BRIEF DESCRIPTION OF THE DRAWINGS

A better understanding of the present invention can be obtained when the following detailed description of the preferred embodiment is considered in conjunction with the following drawings, in which.

Figure 1A:
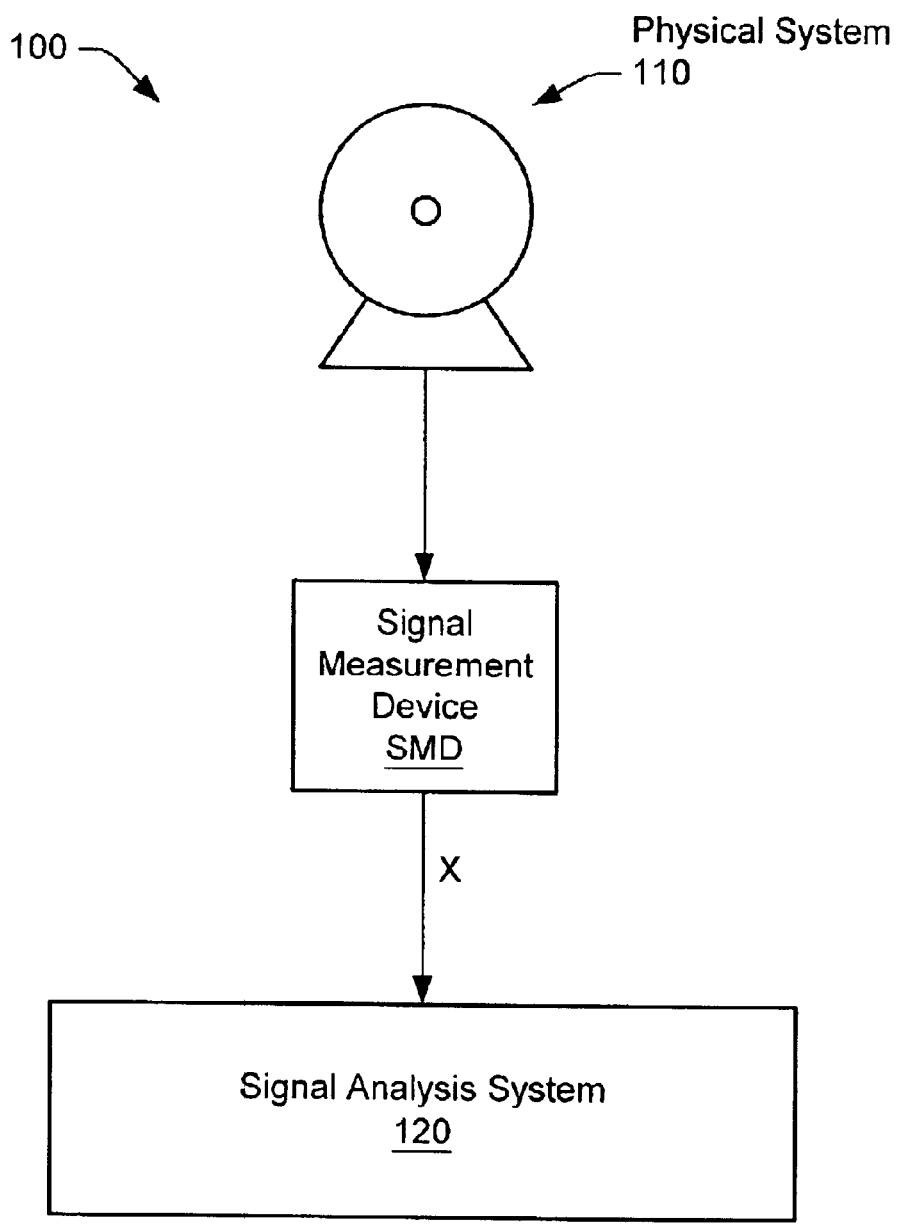
FIG. 1A illustrates a system configuration 100 for analyzing physical signals acquired from a mechanical system comprising one or more rotating elements.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

U.S. Pat. No. 5,353,233 titled "Method and Apparatus for Time Varying Spectrum Analysis" whose inventors are Shie Qian and Dapang Chen, which was issued on Oct. 4, 1994, is hereby incorporated by reference as though fully and completely set forth herein.

U.S. Pat. No. 5,852,567 titled "Iterative Time-Frequency Domain Transform Method for Filtering Time-Varying, Nonstationary Wide Band Signals in Noise", whose inventors are Xiang-Gen Xia and Shie Qian, which was issued on Dec. 22, 1998, is hereby incorporated by reference as though fully and completely set forth herein.

U.S. patent application Ser. No. 09/636,097 titled "System and Method for Analyzing Signals Generated by Rotating Machines", whose inventors are Shie Qian, Hui Shao, and Wei Jin, which was filed on Aug. 10, 2000, is hereby incorporated by reference as though fully and completely set forth herein.

*Joint Time-Frequency Analysis—Methods and Applications* by Shie Qian and Dapang Chen, published by Prentice-Hall, ISBN 0-13-254384-2, is hereby incorporated by reference as though fully and completely set forth herein.

FIG. 1A

FIG. 1A illustrates a system configuration 100 for performing signal analysis. System configuration 100 may comprise a physical system 110 to be analyzed, a signal measurement device SMD and a signal analysis system 120 which may also be referred to as a measurement system. Physical system 110 may be a mechanical system which contains one or more rotating elements. For example, physical system 110 may be an automobile engine, an aircraft engine, a turbine, a disk drive, a tape drive, a fan motor, a boat propeller, or any other machine or device having a rotating element. Physical system may also be various other types of systems that do not include rotating elements. For example, the physical system may be a whale generating a "whalesong", a human voice, or any of various other systems that generate signals having order components.

Signal measurement device SMD is preferably placed proximate to (e.g., on or close to) the physical system 110. Signal measurement device SMD may measure a physical signal generated by physical system 110 and transduce the physical signal into a corresponding electrical signal X. Signal measurement device SMD may present the electrical signal X to signal analysis system 120 in analog and/or digital form. Thus, in one embodiment, signal measurement device SMD includes analog-to-digital conversion hardware. In a second embodiment, digital-to-analog conversion hardware is comprised within signal analysis system 120. Signal measurement device SMD may comprise any of a variety of measurement devices such as a microphone, an accelerometer, a spatial displacement sensor, a strain gauge, a pressure sensor, a temperature sensor (e.g., a thermocouple), a radiation sensor, an optical sensor, etc. In one embodiment, signal measurement device SMD may represent an array of transducers or measurement devices of one or more types. For example, an array of microphones may be distributed at various locations in an engine to acquire audio signals from the engine.

In contrast to U.S. Pat. No. 6,366,862, it may be inconvenient or impossible to position a rotation sensing device (RSD), such as a tachometer, to detect rotations of a rotating element in the physical system 100. Also, as described above, the physical system 100 may not have a rotating element. Thus, here it is presumed that no RSD is present.

Figure 1B:
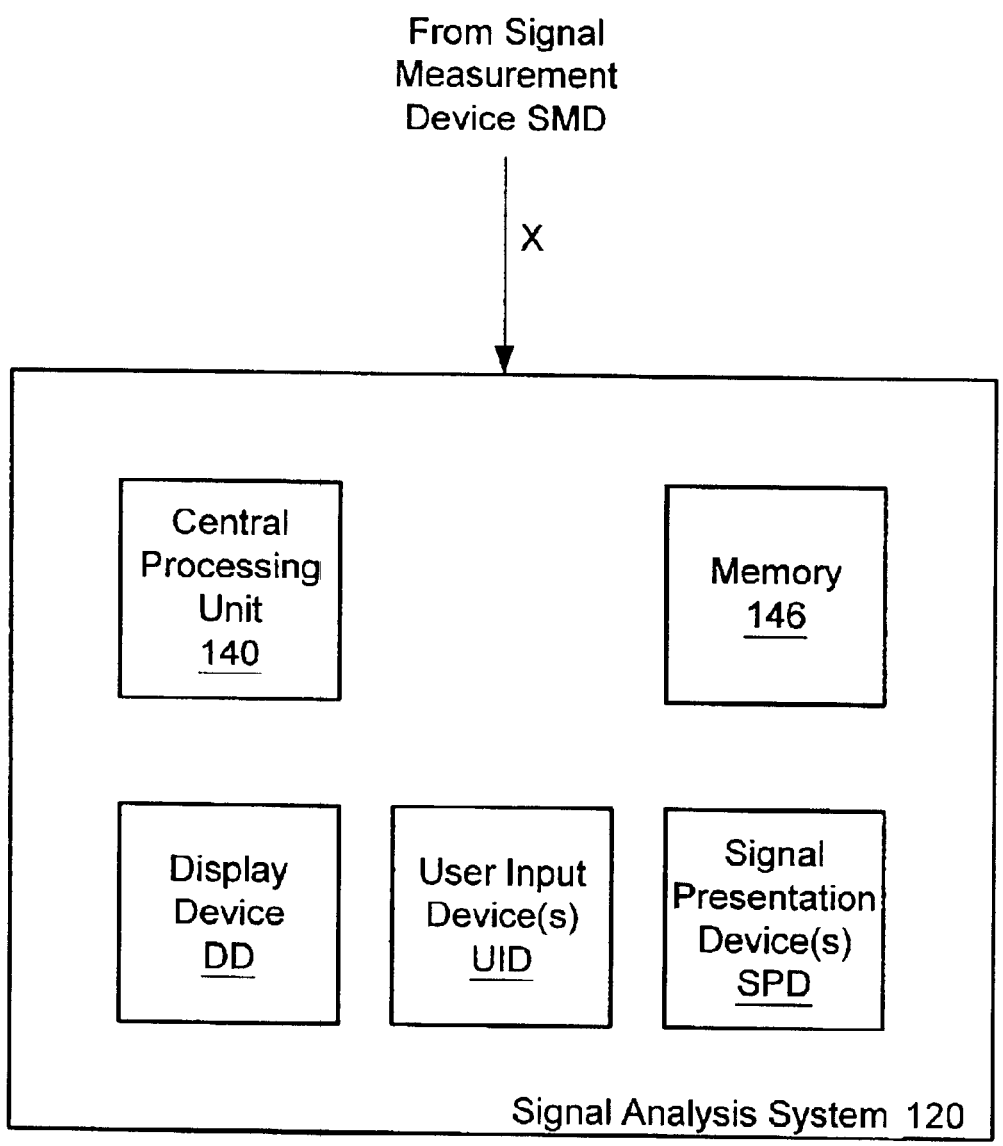
FIG. 1B illustrates one embodiment for a signal analysis system 120.

Signal analysis system 120 may couple to signal measurement device SMD. Signal analysis system 120 may be configured for analyzing one or more order components of a signal generated by or acquired from physical system 110. Signal analysis system 120 may comprise a processor or central processing unit 140, memory 146, signal presentation device(s) SPD, user input device(s) UID and a display device DD as shown in FIG. 1B. CPU 140 may be realized by any of a variety of computational devices such as a general purpose processor, a digital signal processor, a parallel processor, dedicated digital and/or analog circuitry, programmable gate array logic (e.g., an FPGA), etc., or any combination thereof. Memory 146 may comprise any of a variety of memory devices such as random access memory (RAM) and/or read-only memory (ROM), as described further below. Signal analysis system 120 may also include specialized data acquisition and/or signal conditioning hardware, interface hardware, etc., or any combination thereof.

Signal analysis system 120 may comprise any of various devices, such as a programmable computer system, a computer-based system such as a VXI-based system, a PXI-based system, a GPIB-based system, a computer-based data acquisition system, or a dedicated test instrument, such as a dynamic signal analyzer, an oscilloscope or any other signal acquisition and/or analysis device.

Signal analysis system 120 may operate on samples of the electrical signal X generated by signal measurement device SMD, optionally in response to user input(s) provided through user input device(s) UID, and generate an output signal Y. The output signal Y (or a representation thereof) may be presented to the user through signal presentation device(s) SPD.

Signal presentation device(s) SPD may comprise one or more speakers, a display screen (which may be identical to or distinct from display device DD), a projector, a tactile output device, a virtual reality headset, etc., or other types of output devices, or any combination thereof. In one embodiment, signal analysis system 120 may present an audial representation of the output signal Y to a speaker, and/or a graphical depiction of the output signal Y to the display screen. The acoustic or audial presentation (through the speaker) may be especially meaningful in situations where the original physical signal measured by signal measuring device SMD is an acoustic signal, e.g., engine noise.

User input device(s) UID may comprise a keyboard, a pointing device such as a mouse or trackball, a touch pad (such as those used in modem laptop computers for cursor control), a touch sensitive display screen, etc., or other input devices. In one embodiment, user input device(s) UID may include use of a graphical control panel configured with various control icons such as buttons, knobs, sliders, switches, indicators, etc., or any combination thereof. A user provides input to signal analysis system 120 through user input device(s). Signal analysis system 120 may manage a graphical user interface through display device DD and user input device(s) UID.

Figure 2A:
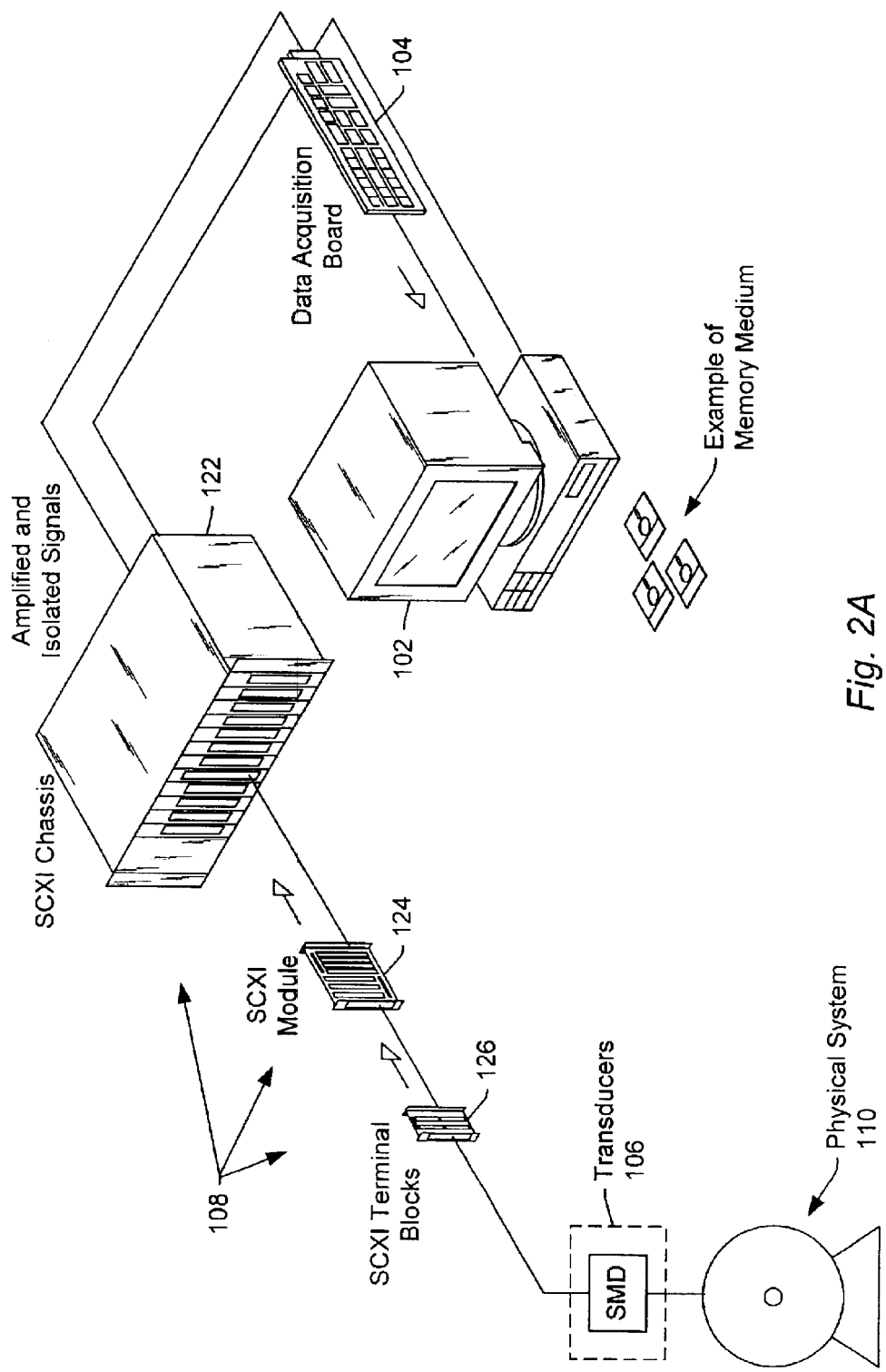
FIG. 2A illustrates one embodiment of signal analysis system 120 comprising a computer-based measurement system, where signals generated by signal measurement device SMD are presented to computer 102 through signal conditioning system 108 and data acquisition (DAQ) device 104.
Figure 2B:
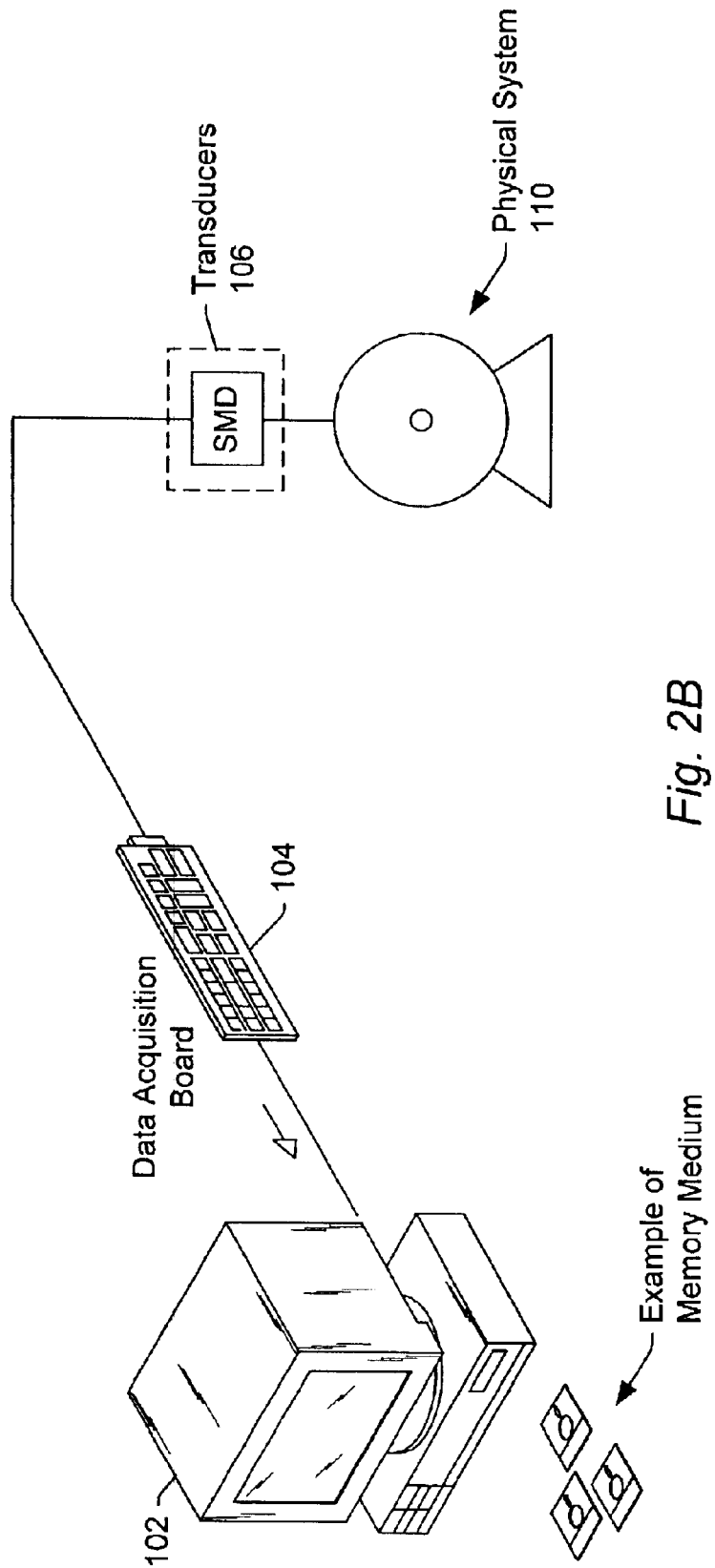
FIG. 2B illustrates a second embodiment of signal analysis system 120 comprising a computer-based measurement system, where signals generated by signal measurement device SMD are presented to computer system 102 through data acquisition (DAQ) device 104.

FIGS. 2A and 2B

FIGS. 2A and 2B illustrate exemplary embodiments of signal analysis system 120. It is noted that FIGS. 2A and 2B represent exemplary embodiments only, and various other embodiments of signal analysis system 120 may include any of various other components.

As shown, signal analysis system 120 may comprise a computer 102, a data acquisition (DAQ) device 104 coupled to the computer 102, and optionally a signal conditioning system 108 coupled to the DAQ device 104. Signal measurement device SMD may comprise a transducer 106 that couples to DAQ device 104 through the signal conditioning circuitry 108. As shown, the transducer 106, e.g., signal measurement device SMD, may couple to physical system 110 to acquire signals from physical system 110. The signal X generated by the transducer SMD may be optionally conditioned by the signal conditioning system 108 as shown in FIG. 2A. The conditioned signals may then be provided to DAQ device 104 as shown. Signal conditioning system 108 may connect to DAQ device 104, e.g., via one or more cables.

Signal conditioning system 108 may comprise an external chassis 122 housing one or more signal conditioning modules 124 and optionally terminal blocks 126. Signal conditioning system 108 may be used to perform signal conditioning on field signals such as the signals generated by signal measurement device SMD. As used herein, the term "signal conditioning" may include one or more of amplifying, linearizing, limiting, isolating, filtering, switching and/or multiplexing field signals (e.g., transducer excitation), among other signal processing functions. Signal conditioning system 108 may advantageously reduce the introduction of noise into the signals transmitted to DAQ device 104. DAQ device 104 may receive conditioned field signal from signal conditioning system 108 as shown in FIG. 2A. Alternatively, DAQ device 104 may directly receive the field signals from transducers 106, e.g., signal measurement device SMD, and signal conditioning may not be necessary. DAQ device 104 may operate to perform analog to digital (A/D) conversion and provide the resultant digital signals to computer 102 for processing.

Computer system 102 may include various standard components, including a processor or central processing unit (CPU) 140, system memory 146, non-volatile memory, one or more buses, and a power supply. DAQ device 104 may be a specialized system for acquiring digital and/or analog signals from external devices. Thus, DAQ device 104 may include analog to digital (A/D) conversion circuitry and/or digital to analog (D/A) conversion circuitry. Examples of the DAQ device 104 include "E series" DAQ boards from National Instruments Corporation. DAQ device 104 may also comprise a computer-based instrument board, such as an oscilloscope, a digital multimeter (DMM), a dynamic signal analyzer, an arbitrary waveform generator, etc. An exemplary dynamic signal analyzer (DSA) board is the NI 4472, sold by National Instruments Corporation.

In one embodiment, computer 102 may comprise input/output (I/O) slots into which DAQ device 104 may be coupled. In another embodiment, computer 102 may comprise a VXI (VME Extensions for Instrumentation) chassis and bus, a GPIB (General Purpose Interface Bus) interface card, a serial port or parallel port by which DAQ device 104 may be coupled to the computer 102.

Signal analysis system 120, e.g., computer system 102, preferably includes at least one memory medium on which computer programs according to the present invention may be stored. The term "memory medium" is intended to include various types of memory or storage, including an installation medium, e.g., a CD-ROM, or floppy disks 104, a computer system memory or random access memory such as DRAM, SRAM, EDO RAM, Rambus RAM, EPROM, EEPROM etc., or a non-volatile memory such as a magnetic media, e.g., a hard drive, or optical storage. The memory medium may comprise other types of memory as well, or combinations thereof In addition, the memory medium may be located in a first computer in which the programs are executed, or may be located in a second different computer which connects to the first computer over a network. In the latter instance, the second computer may provide the program instructions to the first computer for execution. Also, the computer system 102 may take various forms, including a personal computer system, mainframe computer system, workstation, network appliance, Internet appliance, personal digital assistant (PDA), television system, dedicated test or measurement instrument or other device. In general, the term "computer system" can be broadly defined to encompass any system having a processor which executes instructions from a memory medium.

The memory medium preferably stores a software program for analyzing signals including order components, such as signals acquired from a rotating machine. In one embodiment, the software program may be operable to analyze signals acquired or sampled at uniform time intervals and generate order data or order information useful in analyzing the operation of physical system 110.

The software program may be implemented in any of various ways, including procedure-based techniques, component-based techniques, object-oriented techniques, or neural net based learning techniques, among others. For example, the software program may be implemented using ActiveX controls, C++objects, Java objects, Microsoft Foundation Classes (MFC), or other technologies or methodologies, as desired. A CPU, such as the host CPU, executing code and data from the memory medium comprises a means for performing signal analysis on acquired signals according to the methods or flowcharts described below.

Various embodiments further include receiving, storing, and/or transmitting instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

Figure 3:
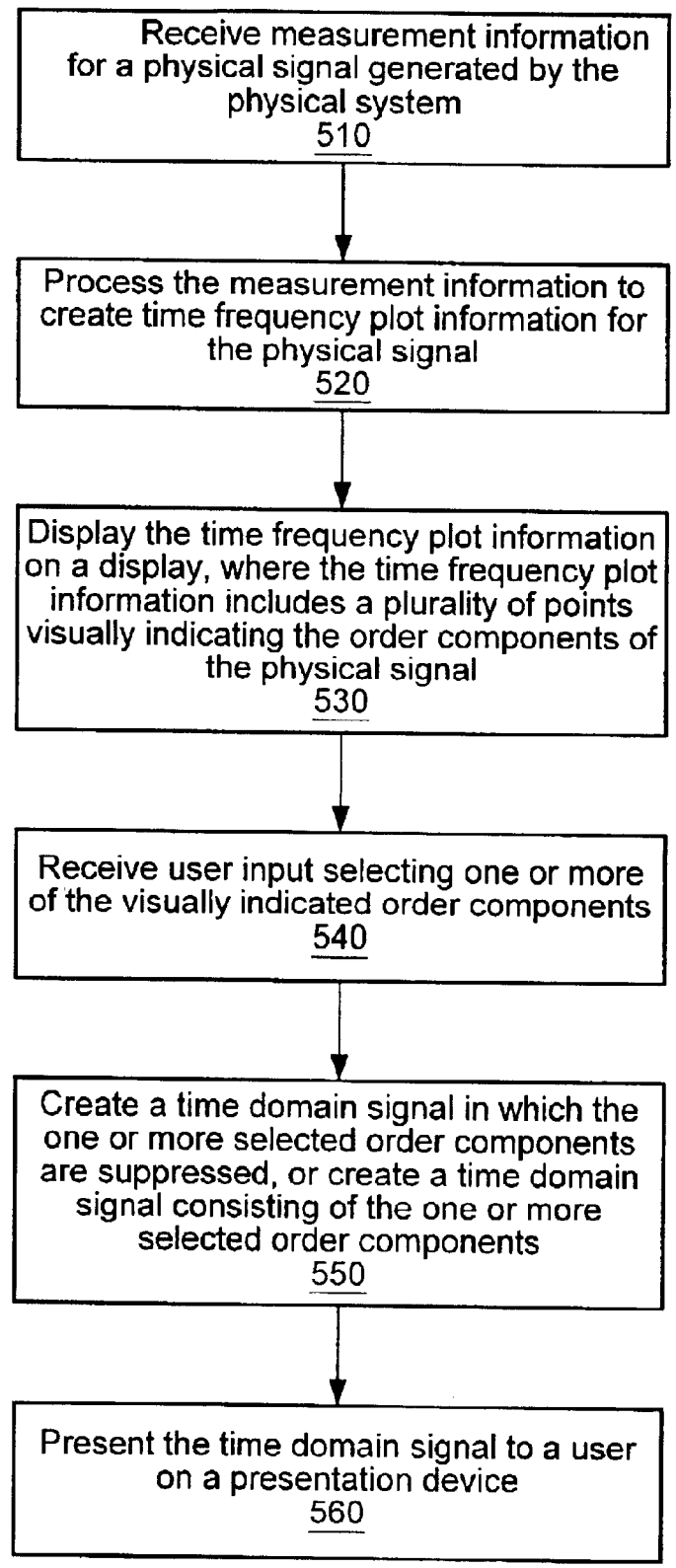
FIG. 3 presents a flowchart for one embodiment of an order analysis method.

FIG. 3—Flowchart Diagram

FIG. 3 illustrates one embodiment of a method for analyzing order components present in the physical signal X acquired from physical system 110. For example, the method of FIG. 3 may be implemented by execution of the computer programs stored on the memory medium as described above. A more detailed method for analyzing order components present in the physical signal X is described below with reference to FIG. 4.

In step 510, measurement information for the physical signal X may be received. The measurement information may include information indicating a plurality of order components of the physical signal X. For example, where the physical system 110 generates sound, the measurement information may include digitized samples of the sound.

In step 520, the measurement information may be processed to create time frequency plot information for the physical signal X. In one embodiment, processing the measurement information may include performing an invertible joint time-frequency transform on the measurement information, as described below.

In step 530, the time frequency plot information may be displayed on the display device DD. The time frequency plot information may include a plurality of points visually indicating the order components of the physical signal X. For example, each order component may appear as an order curve on the display device DD.

In step 540, user input selecting one or more of the visually indicated order components may be received. In various embodiments, the user input may be received in any of various ways. The user input may be received directly to the displayed time frequency plot information. For example, in one embodiment selecting each order component may include receiving user input selecting one or more points proximate to the order component, i.e., proximate to (or on) the corresponding order curve, as described in detail below. The actual order component may be determined based on the one or more selected points proximate to the order component, as also described below.

In step 550, a time domain signal may be created based on the one or more selected order components. In one embodiment, the one or more selected order components may be suppressed from the time domain signal. In another embodiment, the time domain signal may consist only of the one or more selected order components.

In step 560, the time domain signal may be presented to a user on a presentation device. Presenting the time domain signal on the presentation device may enable the user to analyze the physical signal X or the physical system 110. For example, where the physical signal X is an audio signal and the selected order components were suppressed from the time domain signal, presenting the time domain signal on the presentation device may allow the user to listen to the sound generated by the physical system 110, without the sound corresponding to the selected order components.

The method described above may be employed to analyze any of various types of physical signals acquired from any of various types of physical systems. In one embodiment, the physical system may include a rotating element. The method may enable order components of the signal to be analyzed even when no rotation speed information for the rotating element is available.

Figure 4:
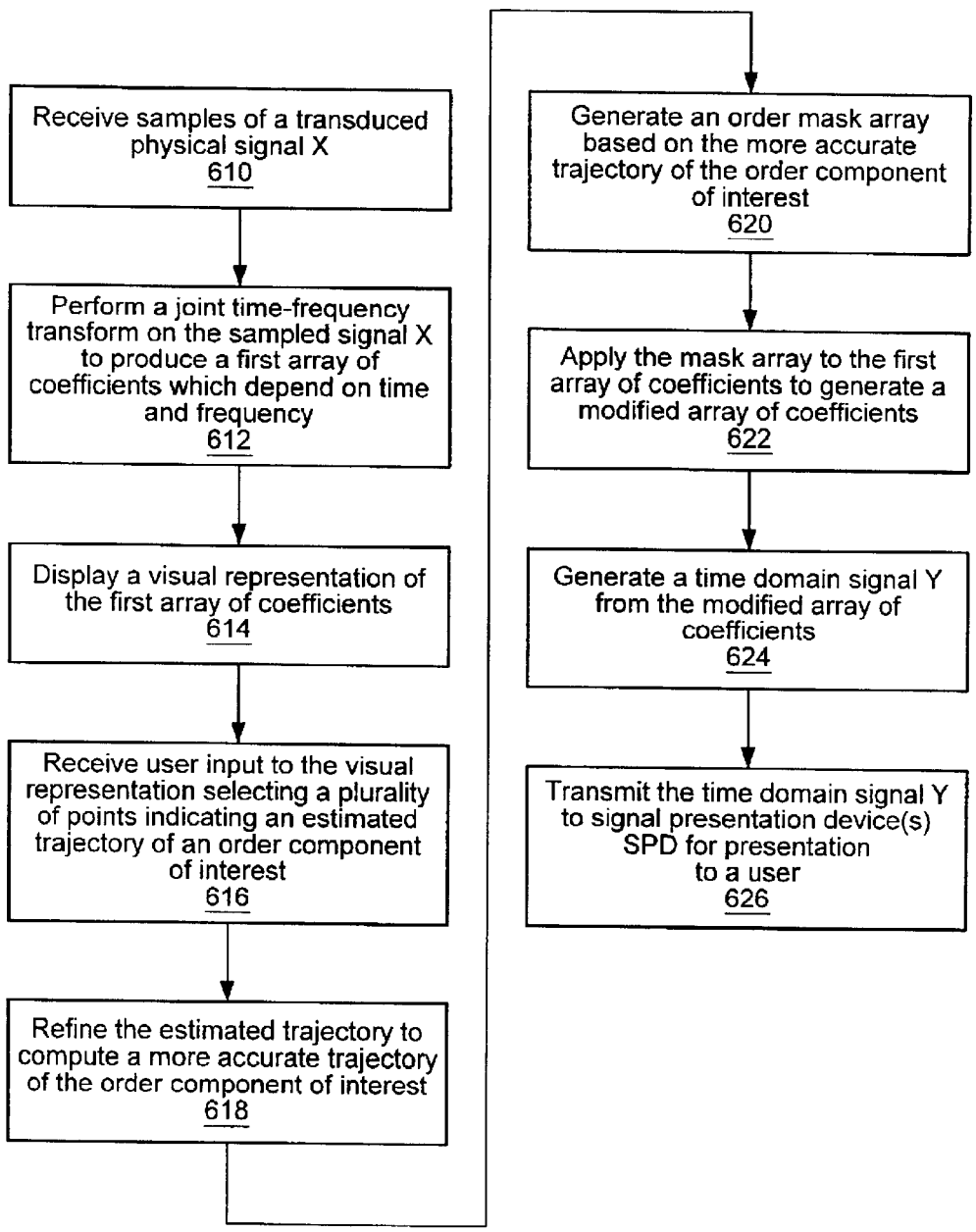
FIG. 4 presents a more detailed flowchart for one embodiment of an order analysis method.

FIG. 4—Flowchart Diagram

FIG. 4 illustrates a more detailed method for analyzing order components present in the physical signal X acquired from physical system 110, according to one embodiment of the invention. The method of FIG. 4 may be implemented by execution of the computer programs stored on the memory medium as described above.

In step 610, signal analysis system 120 receives samples of the transduced physical signal X. These samples are preferably generated with a fixed time interval between successive samples. In other words, the samples may be equally space in time. (The signal measurement device SMD may acquire signals from the physical system 110 and provide digitized samples of these signals to the signal analysis system 120.)

In step 612, signal analysis system 120 may perform an invertible joint time-frequency transform on the sampled signal X to produce a first array (i.e., an initial array) of transform coefficients which depend on time and frequency. The joint time-frequency transform is preferably invertible, meaning that an arbitrary input signal may be recovered (or recovered up to numerical computation error) from its array of transform coefficients by applying a corresponding inverse transform to the transform array.

In the method described herein, one or more order components may be selected for analysis from the joint time-frequency representation (i.e., the first array of coefficients). After selection of the one or more order components for analysis, the coefficients corresponding to these selected order components (not including coefficients corresponding to the non-selected order components) may be converted back into a time domain signal. This resulting time domain signal thus contains information only on the selected order components, thus providing information on these order components in the input signal.

In one embodiment, the joint time-frequency transform is the Gabor transform. For more information on the Gabor transform, see Qian and Chen, *Joint Time-Frequency Analysis*, referenced above. Other joint time-frequency transforms are also contemplated. In one alternative embodiment, the joint-time frequency transform may be a wavelet transform. In another embodiment, the joint-time frequency transform may be the Gabor spectrogram which is described in U.S. Pat. No. 5,353,233, incorporated by reference above. This embodiment using the Gabor spectrogram may be less preferred, since the Gabor spectrogram is not completely invertible.

Figure 5:
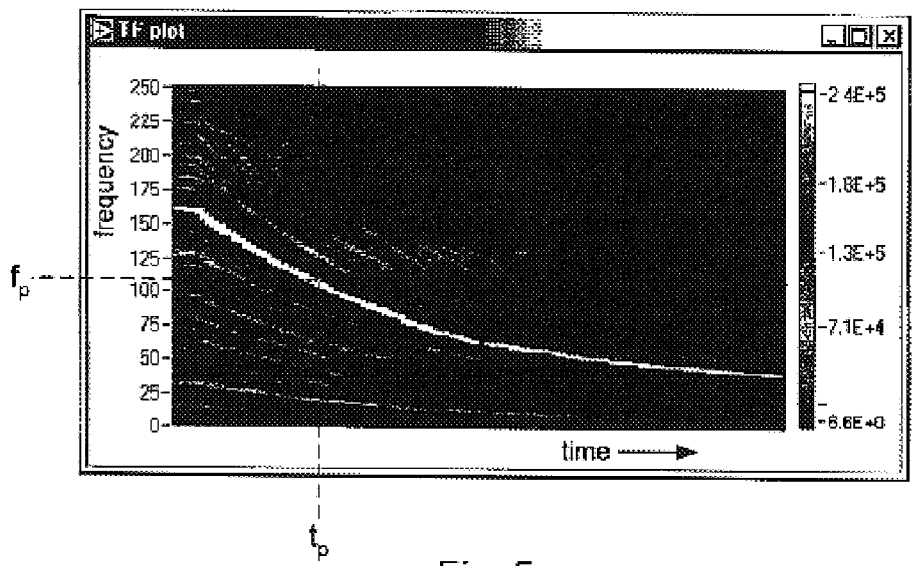
FIG. 5 illustrates a time-frequency transform magnitude plot, i.e., a plot of the magnitude of a joint time-frequency transform for a particular input signal.

FIG. 5 illustrates a magnitude plot of the first array of coefficients generated by a Gabor transform of the original signal X. The horizontal axis denotes time. The vertical axis denotes frequency. Thus, plots such as FIG. 5 are referred to as TF plots (i.e., time-frequency plots). The magnitude of the coefficients comprising the first array are denoted by grayscale with full white indicating a maximal magnitude and full black indicating a minimal magnitude (e.g., zero magnitude). It is noted that gray scale may not map to coefficient magnitude in a linear fashion. Non-linear mapping may be more advantageous in certain situations.

Observe that the TF transform magnitude plot of FIG. 5 exhibits a series of curves which are shaped roughly like decaying exponentials. The coefficient magnitudes along a given curve may be larger than magnitudes off the curve (at least in a local neighborhood of the curve). These curves are referred to herein as order curves. An order curve may correspond to a component of the physical signal X which is periodic with respect to rotation angle of a rotating element. For example, in an automobile engine with 6 cylinders, all six cylinders may fire for each rotation of a crank shaft. Thus, one would expect to see a large magnitude curve for order 6. The order curves of FIG. 5 are shaped like decaying exponentials because the underlying rotating element is decreasing in angular velocity. Thus, as time proceeds, the frequency associated with any given order curve decreases. If the rotating element were increasing in angular velocity, the order curves would increase in frequency as a function of time.

In step 614, signal analysis system 120 may display on display device DD a visual representation of the first array of coefficients produced by the invertible joint time-frequency transform. In one embodiment, the visual representation comprises a TF transform magnitude plot. The visual representation may allow the user to identify order components present in the input signal. The various order components may roughly appear as curves within the visual representation. In one embodiment, the visual representation may be displayed using color information, where the color of each displayed point is based on the intensity value at that point. An exemplary color visual representation is discussed below with reference to FIGS. 6–8. In another embodiment, the visual representation may be displayed using grayscale information, where the grayscale value of each displayed point is based on the intensity value at that point, such as in FIG. 5. The color or grayscale information of the visual representation may allow the user to visually identify which order components have largest magnitude, smallest magnitude, etc.

In step 616, user input selecting a plurality of points indicating an estimated trajectory of an order component of interest may be received to the displayed visual representation. The order component of interest may be an order component that the user desires to extract from the ambient signal X. The user may select any desired order component in step 616, including but not limited to the fundamental order component (i.e. the order component of order one).

The user may select the order component of interest by interacting directly with the visual representation. For example, as described above, the order components may roughly appear as curves within the visual representation. Thus, the user may utilize an input device (such as a mouse, trackball, touchpad, pen device, keyboard, etc.) to select points proximate to the desired curve, e.g., by using the input device to position a cursor at the desired points and selecting each point (e.g., by clicking a button of the mouse or performing a suitable selection action for another type of input device). In addition to selecting the desired points by positioning a cursor, in other embodiments, the points may be selected in any of various other ways. For example, in one embodiment the signal analysis system 120 may provide adjustable cross hairs for the user to indicate particular positions within the displayed visual representation. The user may thus position vertical and horizontal cross hairs with an input device (such as by dragging with a mouse) until the cross hairs intersect at a point on a desired order curve. In another embodiment, the user may select the order component of interest without explicitly selecting individual points. For example, the user may use a pointing device to drag a cursor or trace a path along a curve within the visual representation to indicate the desired order component.

Figure 6:
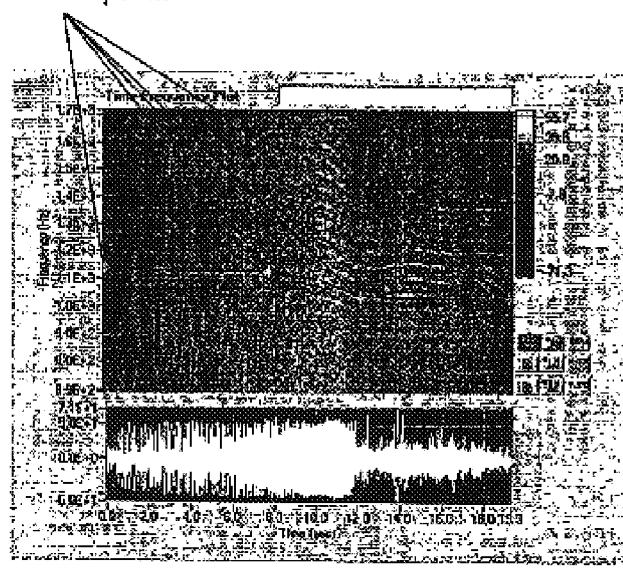
FIGS. 6–8 illustrate a technique for selecting an order component.

The selected points may together approximate the order component. For example, line segments connecting the points may be automatically drawn, or a curve connecting the points may be automatically drawn, e.g., a curve computed using a curve-fitting algorithm (e.g., a spline curve algorithm) to fit a curve to the points. The resulting line segments or computed curve may appear to follow the order component curve in the displayed visual representation, as shown in FIG. 6. The connected line segments or computed curve may thus be referred to as an estimated trajectory of the order component. In an embodiment in which the user traces a path through the visual representation, the specified path may be referred to as the estimated trajectory of the order component.

In one embodiment, signal analysis system 120 may enable the user to request to "zoom in" to or magnify a portion of the visual representation when selecting the points or path in step 616. In response, the specified portion of the visual representation may be re-displayed in an enlarged format. This may enable the user to more accurately select the order component of interest.

In step 618, signal analysis system 120 may operate to refine the estimated trajectory to compute a more accurate trajectory of the order component of interest. For example, the points that the user selected may not be accurate enough, or there may not be a sufficient number of points, to identify the actual trajectory of the order component. The estimated trajectory defined by the user-selected points or path may be utilized to determine the actual trajectory (or a more accurate trajectory) of the order component.

Figure 7:
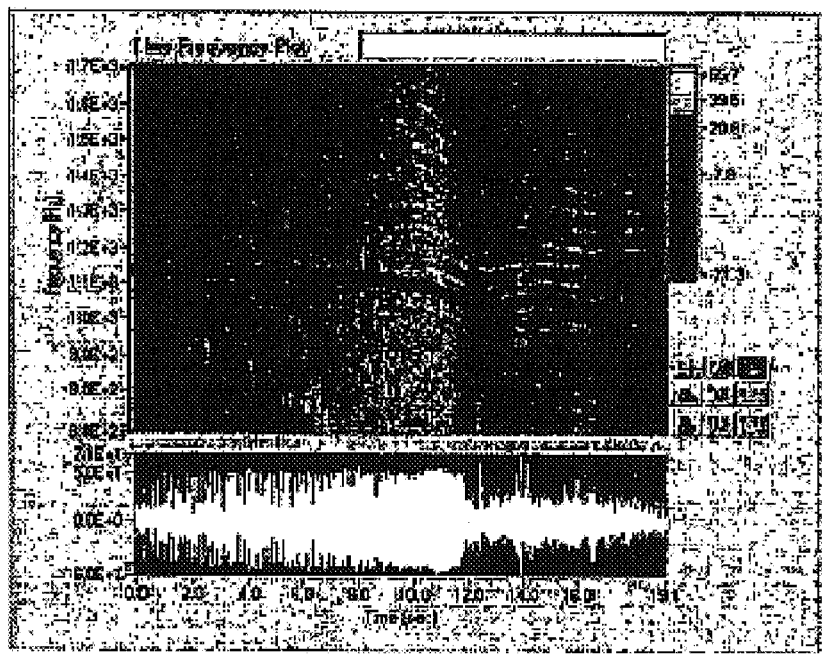

In one embodiment, this may be done by first determining a band of points from the first array of coefficients proximate to the estimated trajectory of the order component. The band may be determined by widening the line segments or curve composing the estimated trajectory, as shown in FIG. 7. In one embodiment, the width of the band may be determined automatically based on the first array of coefficients or on a pre-defined value. In another embodiment, the width of the band may be determined based on user input specifying a desired width.

Signal analysis system 120 may then operate to compute coefficient positions having peak intensity values within the band. The computed peak coefficient positions may then define the actual trajectory of the order component. Thus, the actual trajectory of the order component may include points proximate to the estimated trajectory based on the user-selected points or path, i.e., may include those points within the band having (local) peak intensity values. This may enable a more accurate representation of the order component. In one embodiment, the peak values within the band may be computed according to the following formula:

$$f[mT] = \frac{\sum_{n_0 \leq n \leq n_1} nc[m, n]}{\sum_{n_0 \leq n \leq n_1} c[m, n]}$$

where c[m,n] denotes the values of the discrete Gabor transform and f[mT] represents the peak frequency inside the black band at time mT.

Figure 8:
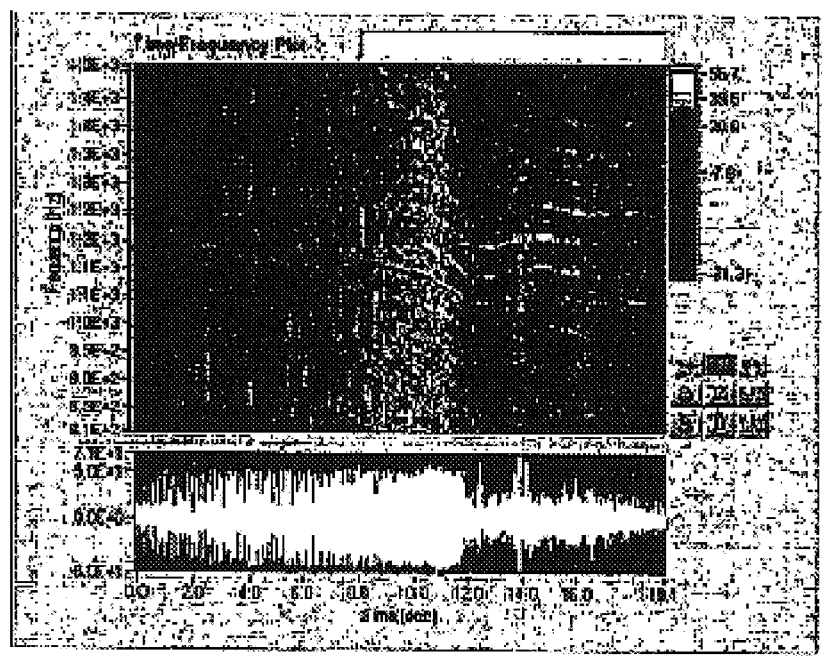

The visual representation may then be updated to display the actual computed trajectory of the order component. This may result in displaying a less-smooth but more accurate trajectory to indicate the order component, as shown in FIG. 8.

In one embodiment, signal analysis system 120 may be operable to detect a situation in which the user has not accurately selected an order curve from the visual representation. For example, the system may analyze intensity values within the band to determine that peak values within one or more portions of the band do not correspond to peak values of other portions of the band, e.g., the difference in peak values may be higher or lower than a threshold value indicating a normal amount of intensity variation within an order component. This may occur, for example, if the user has not selected a sufficient number of points indicating the order curve of interest or has not sufficiently spaced the points, or when the user has mistakenly selected one or more points that lie far from the order curve of interest. Thus, the system may inform the user of the potential problem and provide an opportunity for the user to more accurately select the order curve of interest.

In steps 620 and 622, signal analysis system 120 may generate a modified array (i.e. a second array) of coefficients from the first array of coefficients. The signal analysis system may generate the modified array of coefficients by selecting a subset of coefficient positions (i.e. time-frequency index positions) from the first array, setting coefficients of the modified array equal to zero outside the subset and equal to the corresponding coefficients of the first array on the subset. The subset of coefficient positions may correspond to the order component of interest selected by the user.

Figure 9:
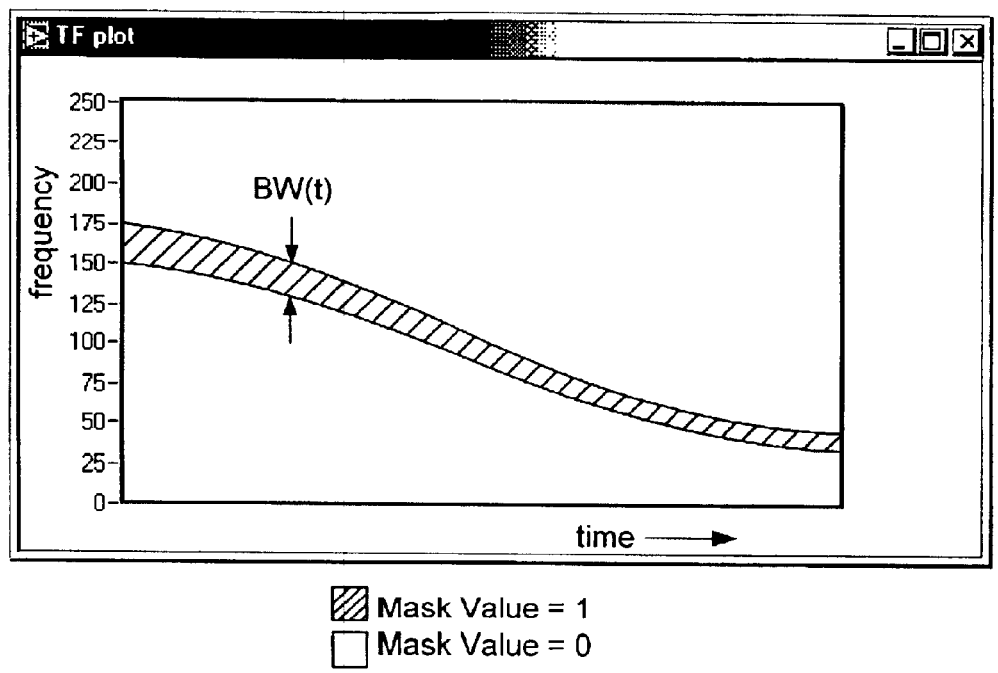
FIG. 9 illustrates the structure of an order mask array configured to retain only one order component of the input signal.

In step 620, signal analysis system 120 may generate an order mask array based on the more accurate trajectory of the order component computed in step 618. The order mask array may comprise an array of coefficients similar in structure to the first array generated by the joint time-frequency transform. Signal analysis system 120 may generate the mask array so that coefficients in a time-frequency neighborhood of the selected order curve(s) are set to one, and coefficients outside the neighborhood may be set to zero, as suggested by FIG. 9. Thus the "one" values in the order mask array select the subset of desired coefficients, while the "zero" values mask out other non-desired coefficients. The desired coefficients correspond to the order component selected by the user in step 616.

In one embodiment, the user may select more than one order component of interest. For example, in one embodiment, after the user has selected a first order component by selecting points as described above, the signal analysis system 120 may be enable the user to automatically select one or more additional order components based on the selected order component. In another embodiment, the user may select the additional order components by repeating the point selection process described above to select points proximate to other displayed curves. Thus, where more than one order component has been selected, the order mask array may be generated so as to select coefficients corresponding to each of the selected order components and to mask out other coefficients.

Signal analysis system 120 may allow the user to adjust properties of the time-frequency neighborhood. For example, the user may be able to control the frequency bandwidth of the time-frequency neighborhood around the desired order curve(s). In one embodiment, signal analysis system 120 may superimpose the boundary of the time-frequency neighborhood on a TF transform magnitude plot displayed to the user through display device DD. Thus, the user may visually observe the time-frequency neighborhood in relation to the desired order curve(s). The frequency bandwidth BW(t) of the neighborhood as a function of time may vary with respect to time. The user may provide inputs which control the frequency bandwidth function BW(t). For example, the user may provide a bandwidth control parameter to signal analysis system 120 through user input device(s) UID. Signal analysis system 120 may determine the frequency bandwidth function BW(t) in response to the bandwidth control parameter.

In step 622, signal analysis system 120 may use the subset of coefficient positions to generate the modified array of coefficients (i.e., the second array) from the first array. For example, signal analysis system 120 may multiply the mask array by the first array to generate the modified array of coefficients. Coefficients of the modified array may be equal to corresponding coefficients of the first array in the time-frequency neighborhood of the desired order curve(s), and may equal zero otherwise. Thus, the mask array may serve to pick out a particular subset of coefficients from the first array which are desired to be analyzed and to suppress (i.e., to set to zero) the coefficients outside the particular subset. The act of suppressing coefficients is also referred to herein as "removing" or "eliminating" the coefficients.

In some embodiments, signal analysis system 120 may generate each coefficient of the modified array by conditionally transferring the corresponding coefficient of the first array of transform coefficients in response to logically testing the corresponding value of the mask array. In other words, a processor (or dedicated circuitry) within signal analysis system 120 may perform operations as indicated by the following pseudo code:

If (Mask(I,J)=1)
    ModifiedArrayCoeff(I,J)=FirstArrayCoeff(I,J)
Else
    ModifiedArrayCoeff(I,J)=0.

The indices I and J parameterize the coefficients of the first array, mask array and modified array.

In step 624, signal analysis system 120 may generate (i.e., compute) a time domain signal Y from the modified array of coefficients, i.e., from the subset of coefficients remaining after the masking operation. Signal analysis system 120 may generate the time domain signal Y by performing an inverse joint time-frequency transform on the modified array of coefficients. The inverse joint time-frequency transform may be the inverse of the forward transform applied in step 612. For example, the inverse transform may be the inverse Gabor transform. In an alternate embodiment, where the wavelet transform was used in step 612, the inverse transform may be an inverse wavelet transform.

The time-domain signal Y may represent the behavior in time of the desired order(s) selected by the user. In step 626, signal analysis system 120 may transmit the time domain signal Y to signal presentation device(s) SPD for presentation to a user. As described above, signal presentation device(s) SPD may comprise at least one speaker. Thus, signal analysis system 120 may transmit samples of the time domain signal Y to a digital-to-analog converter (DAC). The DAC converts the time domain signal Y into a continuous-time (i.e. analog) signal, and transmits the continuous-time signal to the speaker. The user may listen to the acoustic signal generated by the speaker in response to the continuous-time signal. In addition or alternatively, signal presentation device(s) SPD may include a visual display (e.g., display device DD, a projection screen, etc.). Thus, signal analysis system 120 may transmit a graphical representation of the time domain signal Y to the visual display.

Thus, the user may be able to visually observe the time domain signal Y as well as listen to the acoustic representation of time domain signal Y.

The steps above have been described above in terms of a user directly indicating one or more order components to be extracted from the input signal for presentation to the user, e.g., by designating points on the corresponding order curves in a visual representation of the first array of coefficients produced by the invertible joint time-frequency transform. The extraction is accomplished by modifying coefficients in the time-frequency domain, and then, inverse transforming the modified coefficients. The coefficient modification may be accomplished by applying an order mask to the first array, i.e., the transform of the input signal. The order mask is set to one in neighborhoods containing the one or more selected order components respectively, and set to zero outside these neighborhoods.

In another embodiment, signal analysis system 120 may support indirect selection of the one or more desired order components to be extracted (i.e. analyzed). In the indirect selection mode, the user may specify one or more order components to be suppressed (i.e., removed) from the input signal. For example, the user may provide input to the visual representation of the first array of coefficients to designate a point on each of the order component curves which are to be suppressed. Signal analysis system 120 may set the order mask coefficients equal to zero in neighborhoods of the designated order component curves, and equal to one outside these neighborhoods. Thus, the output signal Y represents the input signal minus the one or more suppressed order components. The desired portion of the input signal X to be extracted for analysis may thus be indirectly selected by directly selecting the non-desired order components for suppression.

In one embodiment of signal analysis system 120, the user may toggle between a direct order selection mode and an indirect order selection mode. In the direct order selection mode, order components selected by the user are the desired order components to be analyzed, and the non-selected order components are masked or removed prior to performing the inverse transform in to generate the time domain signal Y. In the indirect order selection mode, order components physically selected by the user are masked or removed, thus effectively "selecting" the remaining portion of the input signal for analysis. Thus, order components may be "selected" either by direct user selection of the desired subset of components, or order components may be "selected" by the user selecting non-desired order components for suppression (i.e., removal).

In some embodiments, signal analysis system 120 may automatically (e.g., programmatically) select one or more order curves for analysis or suppression. Signal analysis system 120 may operate on the first array of coefficients, and automatically detect the fundamental order curve. The fundamental order curve may be detected based on its low frequency and large magnitude. Furthermore, signal analysis system 120 may detect one or more order curves having certain pre-programmed or user-defined properties such as largest magnitude, smallest magnitude, etc. Signal analysis system 120 may extract the one or more order curves from the input signal, and present the one or more order curves to the user through signal presentation device(s) SPD. Alternatively, signal analysis system 120 may subtract (i.e. suppress) the detected one or more order curves from the input signal, and present the remainder signal to the user through signal presentation device(s) SPD. It is noted that the extraction or suppression of order components occurs in the time-frequency transform domain. However, the net result as perceived by the user is that order components have been extracted or suppressed from the input signal.

Estimating the Fundamental Frequency without Rotation Speed Information

As noted above, in one embodiment, signal analysis system 120 may automatically (e.g., programmatically) select one or more order curves for analysis, i.e., may select the one or more order curves without user input specifying the order curve(s). In one embodiment, signal analysis system 120 may estimate the instantaneous rotation frequency signal $F_1(t)$ without receiving any rotation speed information, i.e., without use of a rotation sensing device RSD and rotation indicator signal R.

In one embodiment, signal analysis system 120 estimates the instantaneous rotation frequency signal $F_1(t)$ from transform data, i.e., from the first array of transform coefficients. For example, signal analysis system 120 may scan the first array of coefficients for a time-frequency curve with sufficient coefficient magnitude with the property that none of its integer submultiples have sufficient coefficient magnitude. The magnitude which is considered sufficient may depend on a user-supplied (or program-generated) threshold parameter. In this embodiment, system configuration 100 may not require a rotation sensing device RSD, since signal analysis system 120 may be configured to compute an instantaneous rotation frequency signal $F_1(t)$ without use of rotation indicator signal R. By definition of order number, instantaneous rotation frequency signal $F_1(t)$ defines the order curve of order one (i.e., one cycle per rotation).

In a second embodiment, signal analysis system 120 may allow the user to identify the order curve of order one. For example, the user may designate one or more points on the order curve he/she believes to be the curve of order one. Signal analysis system 120 may apply an search algorithm which walks along the "top of the magnitude ridge" in order to determine the locus of the curve of order one from the selected point(s). Again, since the user identifies the order curve of order one, a rotation sensing device RSD and rotation indicator signal R may not be necessary.

Computing Order Number in Response to Graphical User Input

As described above, signal analysis system 120 may receive user input specifying a desired order curve. The coordinates (e.g. the horizontal and vertical pixel coordinates) of the selected point may be used to compute a corresponding time-frequency pair $(t_p, f_p)$ for the selected point. Signal analysis system 120 may evaluate (estimate or interpolate) an instantaneous rotation frequency value $F_1(t_p)$ appropriate for time $t_p$, and divide frequency $f_p$ by the evaluated instantaneous rotation frequency $F_1(t_p)$ in order to determine the order number of the desired order curve. In other words, the order number C of the desired order curve equals $f_p/F_1(t_p)$. In some embodiments, the user may enter the order number C of the desired order curve directly, and thus the computation of the order number C based on a selected point may not be necessary.

Time-Order Magnitude Plotting

As described above, signal analysis system 120 computes a joint time-frequency transform of the original input signal X. The transform function K(t,f) depends on time and frequency. Thus, it is natural to plot the magnitude of transform function K(t,f) as a function of time and frequency as shown in FIGS. 5 and 6. However, to further reveal the order structure of the input signal X, it may be advantageous to plot magnitude of the transform as a function of time and order. Thus, signal analysis system 120 may compute coefficients for a function L(t,N) of time and order N according to the relation $$L(t,N)=K(t,N*F_1(t)).$$

Figure 10:
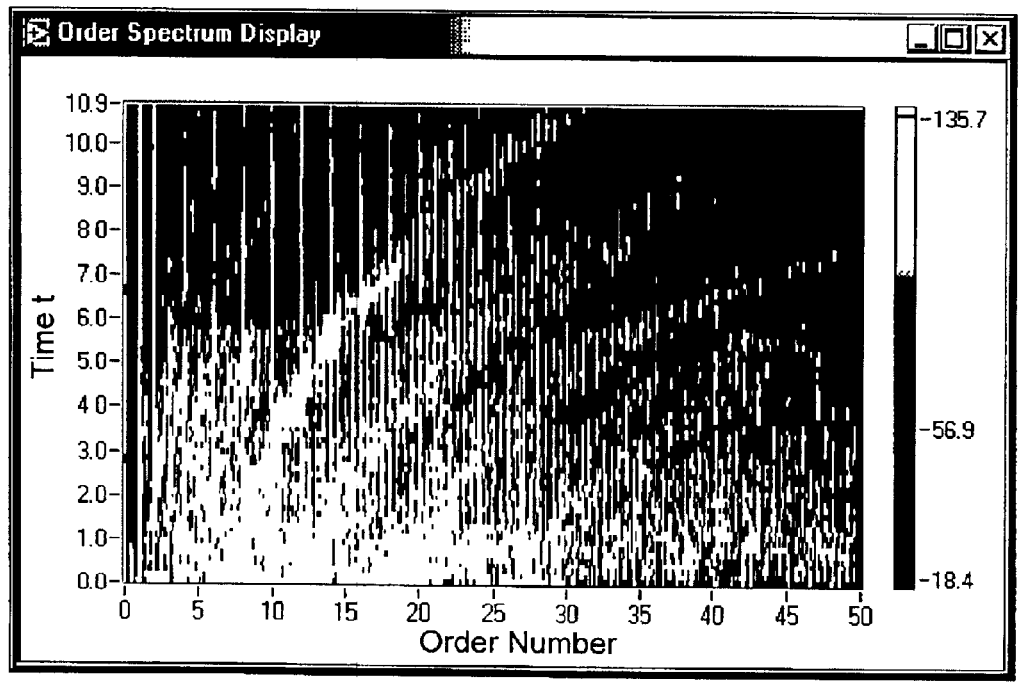
FIG. 10 presents a time-order transform magnitude plot for the same signal as depicted in FIG. 5.

In other words, each line of constant time at time t in the time-frequency plot may be contracted in frequency by a factor equal to the corresponding instantaneous rotation frequency $F_1(t)$. Order N may equal any rational number. Signal analysis system 120 may display the magnitude of time-order transform function L(t,N) as a function of time and order as shown in FIG. 10. Magnitude may be indicated by gray scale or by color along a color continuum. Because order number is the horizontal parameter in FIG. 10, order curves appear as vertical lines.

The user may be able to visually identify which orders have largest magnitude, smallest magnitude, etc. by observing the time-order transform magnitude display (as shown in FIG. 10). The user may provide an indication of an order curve which he/she desires to extract or suppress from the ambient signal X through user input device(s) UID. For example, the graphical user interface managed by signal analysis system 120 may provide adjustable cross hairs for the user to indicate desired positions within the displayed time-order transform magnitude display. The user may drag vertical and horizontal cross hairs with a pointing device (such as a mouse) until the cross hairs intersect at a point on a particular order curve. In addition (or alternatively), the user may move a screen cursor with a cursor control device (such as a mouse, trackball, etc.) until the cursor lies on a point a particular order curve. In response to a user selection event (e.g., clicking on a mouse button), signal analysis system 120 may receive horizontal and/or vertical coordinates of the selected point on the selected order curve. Signal analysis system 120 may compute an order number for the selected order curve from the coordinate(s) of the selected point. In some embodiments, the user may be able to enter an order number (e.g., on a numeric keypad) to select an order curve.

In one embodiment, signal analysis system 120 may be configured to extract as many order components as desired from the original signal X. For example, the user may select points on one or more order curves in a time-frequency (and/or time-order) transform magnitude plot. Signal analysis system 120 may compute order numbers for the selected order curves from the coordinates of the selected points as described above. Furthermore, the user may be able to enter one or more order numbers (e.g. on a numeric keypad) to select desired order curves. Signal analysis system 120 may compute a locus for the fundamental order curve (i.e. the order curve of order one) by any of various methods described herein, and may then compute a locus for each of the desired order curves by multiplying the fundamental order curve by the order numbers corresponding to the desired order curves. Furthermore, signal analysis system 120 may:

(a) construct an order mask which takes the value one in a time-frequency neighborhood of each of the selected (desired) order curves, and zero outside the union of these neighborhoods;

(b) mask the first array of transform coefficients with the order mask, thereby generating a second array (i.e. the modified array) of coefficients;

(c) apply an inverse joint time-frequency transform (e.g. inverse Gabor transform) to the second array of coefficients, thus generating a time-domain signal containing the desired order components;

(d) present the time-domain signal to the user through signal presentation device(s) SPD.

Figure 11A:
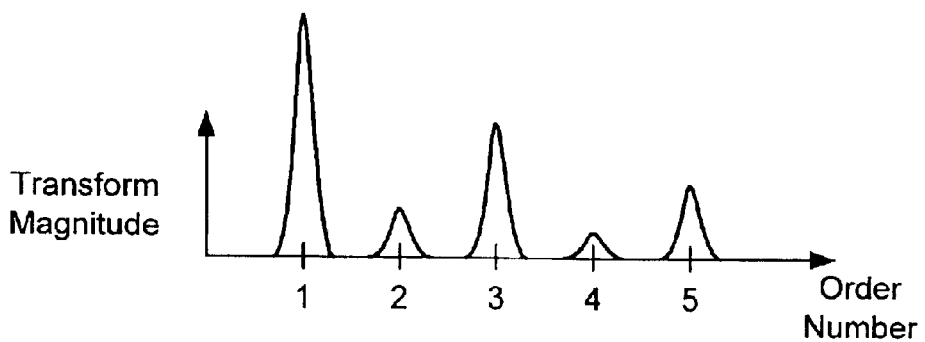
FIGS. 11A–E illustrate various embodiments of signal analysis system 120 in which one or more order components of the input signal X may be extracted from the input signal or suppressed in the input signal.

In FIG. 11A, a single time-slice of a time-order transform magnitude plot is displayed.

Figure 11B:
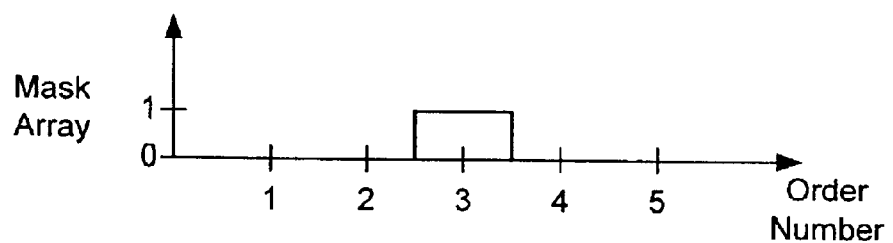

FIG. 11B illustrates an order mask generated by signal analysis system 120 in response to the user's selection of a single order component with order number equal to three. Signal analysis system 120 may mask the first array of transform coefficients with an order mask corresponding to FIG. 11B, and thus generate a second array of coefficients corresponding to only the third order component. The second array may be inverse transformed to generate samples of a time-domain signal. The time-domain signal comprises the third order component of the original signal X. This time-domain signal may be presented to the user through signal presentation device(s) SPD (e.g. a display and/or speaker). The order mask is preferably organized as an array of coefficients which depend on time and frequency just like the first array of coefficients (generated by transformation of the input signal). The illustration of the mask array in FIG. 11B as a function of order number succinctly characterizes the structure of the mask array, and does not necessarily imply that the mask array is stored as a function of order number. The same observation applies to the examples of FIGS. 11C through 11E.

Figure 11C:
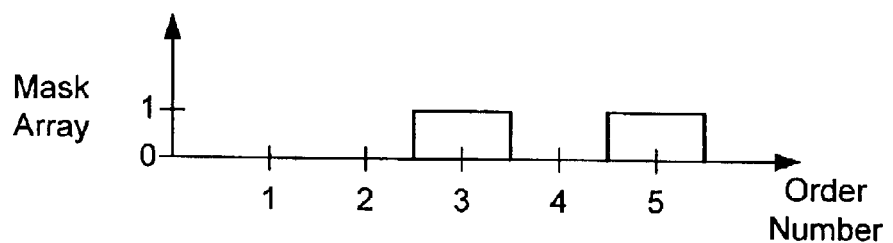

FIG. 11C illustrates an order mask generated by signal analysis system 120 in response to the user's selection of two order components with order numbers three and five respectively. Signal analysis system 120 may mask the first array of transform coefficients with the order mask indicated in FIG. 11C, and thus, generate a second array of coefficients corresponding to the third and fifth order components. The second array may be inverse transformed to generate samples of a time-domain signal. The time-domain signal comprises the third and fifth order components of the original signal X. This time-domain signal may be presented to the user through signal presentation device(s) SPD (e.g. a display and/or speaker).

In another embodiment, the user may provide input indicating order components to be masked or removed, thereby effectively selecting the remaining components for analysis (i.e. extraction). Thus, the user may provide an indication of one or more order curves which he/she desires to suppress (i.e. subtract) from the original signal X. The graphical user interface managed by signal analysis system 120 may allow the user to graphically select one or more points on the one or more order curves which he/she desires to suppress from the original signal X. Signal analysis system 120 may compute order numbers for the selected order curves from the coordinates of the selected points as described above. Furthermore, the user may be able to enter one or more order numbers (e.g. on a numeric keypad) to select order curves. Signal analysis system 120 may compute the locus of the fundamental order curve (i.e. the order curve of order one) by any of various methods described herein, and may compute the locus of the selected order curves by multiplying the fundamental order curve by the order numbers corresponding to the selected order curves. Furthermore, signal analysis system 120 may:

(a) construct an order mask which takes the value zero in a time-frequency neighborhood of each of the selected order curves, and one outside the union of these neighborhoods;

(b) mask the first array of transform coefficient with the order mask, thereby generating a second array (i.e. the modified array) of coefficients;

(c) apply an inverse joint time-frequency transform (e.g. inverse Gabor transform) to the second array of coefficients, thus generating a time-domain signal which corresponds to the original signal X minus the selected order components;

(d) present the time-domain signal to the user through signal presentation device(s) SPD.

Figure 11D:
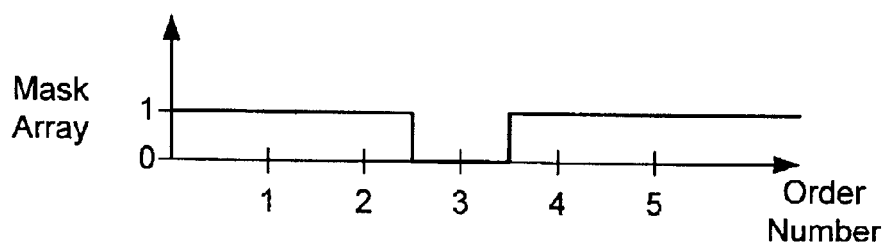

FIG. 11D illustrates an order mask generated by signal analysis system 120 in response to the user's selection of a single order component with order number equal to three for suppression from the original signal X. The order mask takes the value zero in a neighborhood of order number three and one outside this neighborhood. Signal analysis system 120 may mask the first array of transform coefficients with the order mask indicated in FIG. 11D, and thus, generate a second array of coefficients corresponding to the original signal X minus only the third order component. The second array may be inverse transformed to generate samples of a time-domain signal. The time-domain signal represents the original signal minus (i.e. without) the third order component. This time-domain signal may be presented to the user through signal presentation device(s) SPD (e.g. a display and/or speaker).

Figure 11E:
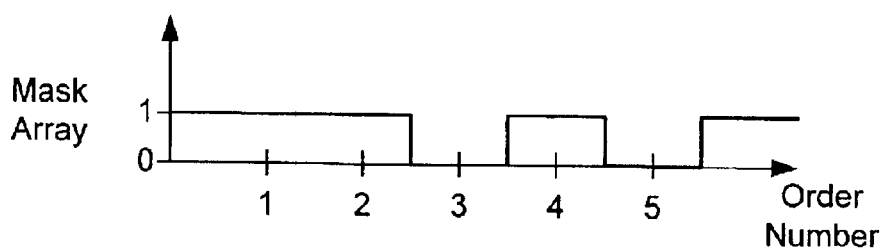

FIG. 11E illustrates an order mask generated by signal analysis system 120 in response to the user's selection of two order components with order numbers three and five respectively for suppression from the original signal X. The mask array takes the value zero in neighborhoods of order three and five, and the value one outside these neighborhoods. Signal analysis system 120 may mask the first array of transform coefficients with the order mask indicated in FIG. 11E, and thus, generate a second array of coefficients corresponding to the original signal X minus the third and fifth order components. The second array may be inverse transformed to generate samples of a time-domain signal. The time-domain signal represents the original signal minus (i.e. without) the third and fifth order components. This time-domain signal may be presented to the user through signal presentation device(s) SPD (e.g. a display and/or speaker).

As noted above, signal analysis system 120 is configured to extract or suppress any desired number of order components from the original signal X. The graphical user interface maintained by signal analysis system 120 may also allow the user to select order curves and/or order numbers, and to select per order curve (and/or per order number) whether the order curve is to be extracted or suppressed.

The present invention contemplates automated methods for selecting order components for extraction or suppression (i.e., programmatic selection of order components). For example, signal analysis system 120 may determine one or more order components having largest magnitudes, and may automatically extract (or suppress) these order components and suppress (or extract) the remaining order components. Signal analysis system 120 may be programmed by a user to search for order components having any desired set of properties, and to extract (i.e. to pass to the output) or suppress the discovered order components.

Scaling Function

In some embodiments, signal analysis system 120 may be configured to apply a scaling function to the first array of transform coefficients instead of (or in addition to) applying a binary-valued order mask as described above. The scaling function may serve to emphasize or de-emphasize selected order components. Signal analysis system 120 generates the scale array in response to user inputs, and multiplies the scale array by the first array of transform coefficients, thus generating a third array of coefficients. The third array of coefficients is inverse transformed. The resulting time-domain signal Y is presented to the user graphically and/or acoustically (i.e. through a display and/or a speaker).

Figure 12A:
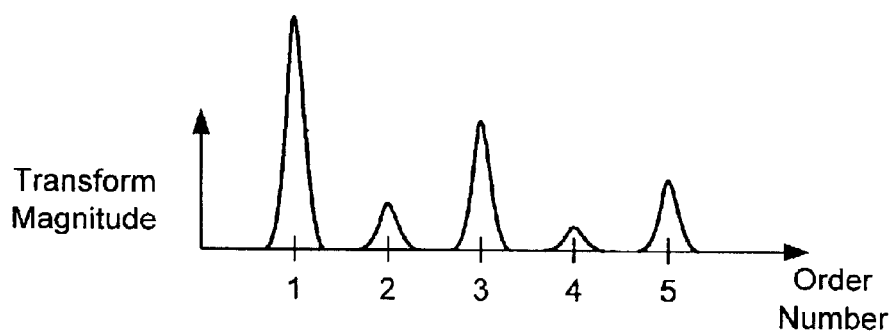
FIGS. 12A–E illustrate various embodiments of signal analysis system 120 in which one or more order components of the input signal X may be emphasized or de-emphasized by multiplying transform coefficients by a scaling function.
Figure 12B:
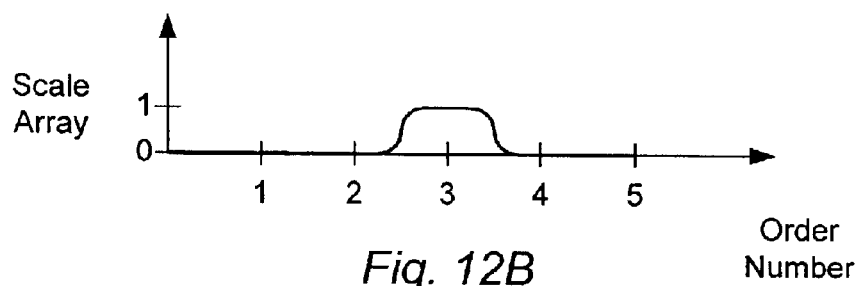

For example, FIG. 12A illustrates a transform magnitude plot of a signal at a single time-slice, and FIGS. 12B–E correspond to several of a variety of possible scale arrays (i.e. scaling functions). FIG. 12B corresponds to a scale array which is configured to extract order component three and to suppress all other order components. The scale array may have smooth transitions between band pass regions and band reject regions. The scale array is preferably organized as an array of coefficients which depend on time and frequency just like the first array of coefficients. The illustration of the scale array in FIG. 12B as a function of order number succinctly characterizes the structure of the scale array, and does not necessarily imply that the scale array is stored or accessed as a function of order number. The same observation applies to the examples of FIGS. 12C through 12E.

Figure 12C:
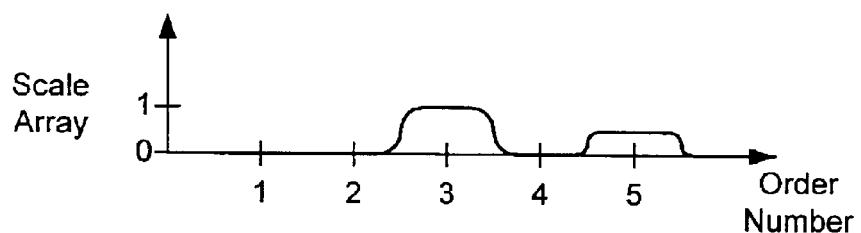
Figure 12D:
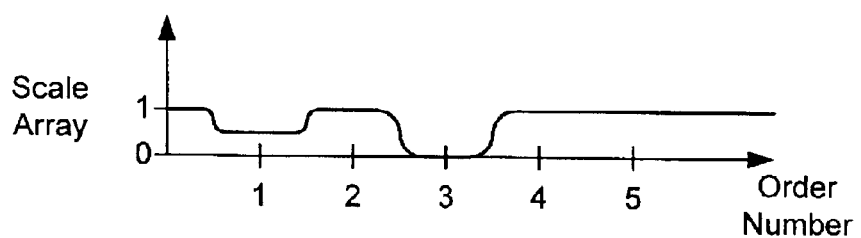
Figure 12E:
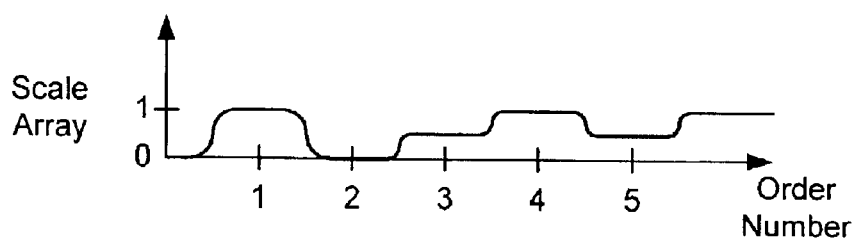

FIG. 12C corresponds to a scale array which is configured to pass order component three, to attenuate order component five by a factor of ½ and to reject all other order components. FIG. 12D corresponds to a scale array which is configured to reject order component three, to attenuate order component one, and to pass all other orders. FIG. 12E corresponds to a scale array which is configured to pass order components one, four and any order components above five, to attenuate order components three and five, and to reject order component two and order components below one. Arbitrary scaling arrays are contemplated. The user may specify the properties of a scaling array to achieve any desired effect on one or more order components of the original signal X. For example, the user may specify an order curve (e.g. by selecting a point on the order curve), and assign a scaling value to the order curve, i.e. a real number value which determines by how much the order curve is to be amplified and/or attenuated. The scaling value may be entered in terms of decibels, or any other convenient set of units.

While the above examples have illustrated masking and/or scaling of order components having integer order numbers, it is understood that masking and/or scaling of order components having non-integer order numbers may be performed just as easily.

Engine Noise Example

The following is an example of the operation of one embodiment of the present invention in an automobile engine application. Consider a situation where a user desires to reduce the engine noise in the engine of an automobile. In this case, the user may arrange one or more microphones proximate to the engine and acquire signals from these microphones. The user may then iteratively select various order components of the acquired signals to analyze or listen to in order to determine what components of the acquired signals contribute most to the engine noise. Alternatively, the user may iteratively select various order components of the acquired signals to mask out or remove from the input signal, and then listen to the input signal minus these components. As described above, the present invention may enable the user to accomplish these tasks without acquiring a tachometer signal from the engine.

Thus the user may be able to determine which components of the acquired signals contribute most to the engine noise. The user may then adjust the engine in various ways, such as changing the design of the engine, replacing one or more components of the mechanical system, predicting a failure of one or more components of the mechanical system, and/or adding a sound-absorbent material to one or more locations of the mechanical system to reduce the engine noise.

Analyzing Multiple Order Component Families from an Acquired Signal

In one embodiment, the system and method is operable to analyze multiple order component families from an acquired signal. For example, an acquired signal may contain information from two or more independent signal sources or two or more different rotating elements, e.g., two or more different engines. The order components associated or originating from a respective source, such as a respective rotating element, may be referred to as an "order family". In this instance, each order family may be responsive to the rotation rate of the corresponding rotating element. These respective order families may be analyzed independently using the methods described above. For example, the user may visually distinguish order components from these different order families in a visual representation of the time-frequency coefficients (the first array of coefficients) and the user may select different order components from these order families for analysis.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for analyzing a physical system having one or more rotating elements, the method comprising:

receiving measurement information for a physical signal generated by the physical system, wherein the measurement information includes information indicating a plurality of order components of the physical signal, and wherein the measurement information does not include rotation speed information;

processing the measurement information to create time frequency plot information for the physical signal;

displaying the time frequency plot information on a display, wherein the time frequency plot information includes a plurality of points visually indicating the order components of the physical signal;

receiving user input selecting one or more of the visually indicated order components;

performing one of:
a) creating a time domain signal in which the one or more selected order components are suppressed; or
b) creating a time domain signal consisting of the one or more selected order components; and presenting the time domain signal to a user on a presentation device;

wherein the time domain signal is useable in analyzing the physical system having one or more rotating elements.

2. The method of claim 1, wherein said plurality of points visually indicating the order components of the physical signal comprises the plurality of points visually indicating order curves corresponding to the order components;

wherein, for each selected order component, receiving user input selecting the order component comprises receiving user input selecting one or more points proximate to the corresponding order curve.

3. The method of claim 2, further comprising:

for each selected order component, determining a plurality of points comprising the order component based on the one or more selected points proximate to the corresponding order curve.

4. The method of claim 3,
wherein, for each selected order component, said determining the plurality of points comprising the order component comprises:
computing a curve fitted to the selected points proximate to the corresponding order curve; and
determining points having peak magnitudes proximate to the computed curve, wherein the points having peak magnitudes proximate to the computed curve comprise the order component.

5. The method of claim 4,
wherein said determining points having peak magnitudes proximate to the computed curve comprises:
determining a band of points including the computed curve; and
determining points having peak magnitudes within the band.

6. The method of claim 1,
wherein the presentation device comprises at least one speaker;
wherein said presenting the time domain signal to the user on the presentation device comprises audially presenting the time domain signal as sound output from the at least one speaker.

7. The method of claim 1,
wherein the presentation device comprises a display;
wherein said presenting the time domain signal to the user on the presentation device comprises visually displaying the time domain signal on the display.

8. A method for analyzing an input signal, the method comprising:
receiving samples of the input signal, wherein the input signal is sampled in time;
performing an invertible joint time-frequency transform on the samples of the input signal to produce a first array of coefficients which depend on time and frequency;
receiving user input selecting a plurality of points from the first array of coefficients, wherein the points are proximate to an order component present in the first array of coefficients;
determining a trajectory of the order component based on the selected points, wherein the trajectory comprises a subset of the points from the first array of coefficients;
generating a modified array of coefficients based on the trajectory;
generating a time domain signal from the modified array of coefficients; and
presenting the time domain signal to a user on a presentation device;
wherein the time domain signal is useable in analyzing information present in the signal.

9. The method of claim 8,
wherein the input signal is acquired from a physical system having a rotating element;
wherein the time domain signal is useable in analyzing the physical system having the rotating element.

10. The method of claim 9,
wherein said receiving samples of the input signal does not include receiving rotation speed information indicating rotation speed of the rotating element;
wherein the method is operable to analyze the input signal without utilizing rotation speed information.

11. The method of claim 8, wherein said determining the trajectory of the order component based on the selected points comprises:
estimating a trajectory of the order component based on the selected points, wherein the estimated trajectory comprises a curve fitted to the selected points; and
determining a more accurate trajectory of the order component based on the estimated trajectory of the order component.

12. The method of claim 11, wherein said determining the more accurate trajectory of the order component based on the estimated trajectory of the order component comprises:
determining a band of points from the first array of coefficients proximate to the estimated trajectory of the order component; and
determining coefficient positions having peak intensity values within the band, wherein the coefficient positions having peak values define the more accurate trajectory of the order component.

13. The method of claim 12,
wherein the width of the band is determined automatically based on the first array of coefficients.

14. The method of claim 12,
wherein the width of the band is determined based on user input specifying a desired width.

15. The method of claim 8,
wherein said generating the modified array of coefficients comprises setting coefficients of the modified array equal to zero at positions other than coefficient positions of the points in the trajectory.

16. The method of claim 15,
wherein said generating the modified array of coefficients further comprises setting coefficients of the modified array equal to coefficients of the first array at coefficient positions of the points in the trajectory.

17. The method of claim 8, further comprising:
displaying a visual representation of the first array of coefficients;
wherein said receiving user input selecting a plurality of points from the first array of coefficients comprises receiving user input to the visual representation of the first array of coefficients.

18. The method of claim 8,
wherein the presentation device comprises at least one speaker;
wherein said presenting the time domain signal to the user on the presentation device comprises audially presenting the time domain signal as sound output from the at least one speaker.

19. The method of claim 8,
wherein the presentation device comprises a display;
wherein said presenting the time domain signal to the user on the presentation device comprises visually displaying the time domain signal on the display.

20. The method of claim 8, wherein said generating the time domain signal from the modified array of coefficients comprises performing an inverse joint time-frequency transform on the modified array of coefficients.

21. The method of claim 8, wherein the joint time-frequency transform comprises the Gabor transform.

22. The method of claim 8,
wherein the input signal is acquired from a mechanical system;
wherein the method further comprises adjusting the mechanical system in response to analysis of the time domain signal.

23. The method of claim 22, wherein said adjusting the mechanical system comprises one or more of: 1) changing a design of the mechanical system; 2) replacing one or more components of the mechanical system; 3) predicting a failure of one or more components of the mechanical system; and 4) adding a sound-absorbent material to one or more locations of the mechanical system.

24. The method of claim 8, wherein the input signal comprises a signal generated by a microphone proximate to a mechanical system.

25. The method of claim 8, further comprising:
constructing a scaling array in response to user input, wherein said generating the modified array of coefficients comprises scaling the first array with the scaling array.

26. The method of claim 25, wherein said scaling array is configured to emphasize one or more order components in the input signal.

27. The method of claim 25, wherein said scaling array is configured to de-emphasize one or more order components in the input signal.

28. A system for analyzing an input signal, the system comprising:
an input for receiving samples of an input signal, wherein the input signal is sampled in time;
a processor coupled to the input;
a memory medium coupled to the processor which stores analysis software;
wherein the processor is operable to execute the analysis software to:
perform an invertible joint time-frequency transform on the samples of the input signal to produce a first array of coefficients which depend on time and frequency;
receive user input selecting a plurality of points from the first array of coefficients, wherein the points are proximate to an order component present in the first array of coefficients;
determine a trajectory of the order component based on the selected points, wherein the trajectory comprises a subset of the points from the first array of coefficients;
generate a modified array of coefficients based on the trajectory;
generate a time domain signal from the modified array of coefficients; and
a presentation device coupled to the processor which is operable to present the time domain signal to a user;
wherein the time domain signal is useable in analyzing information present in the signal.

29. The system of claim 28,
wherein the system has a rotating element;
wherein the time domain signal is useable in analyzing operation of the rotating element.

30. The system of claim 29,
wherein said input receiving samples of the input signal does not include the input receiving rotation speed information indicating rotation speed of the rotating element;
wherein the processor is operable to execute the analysis software to present the time domain signal to the user without utilizing rotation speed information.

31. The system of claim 28, wherein, in determining the trajectory of the order component based on the selected points, the processor is operable to:
estimate a trajectory of the order component based on the selected points, wherein the estimated trajectory comprises one or more line segments connecting the selected points; and
determine the actual trajectory of the order component based on the estimated trajectory of the order component.

32. The system of claim 31, wherein, in determining the actual trajectory of the order component based on the estimated trajectory of the order component, the processor is operable to:
determine a band of points from the first array of coefficients proximate to the estimated trajectory of the order component; and
determine coefficient positions having peak values within the band, wherein the coefficient positions having peak values define the actual trajectory of the order component.

33. The system of claim 32,
wherein the processor is operable to determine the width of the band automatically based on the first array of coefficients.

34. The system of claim 32,
wherein the processor is operable to determine the width of the band based on user input specifying a desired width.

35. The system of system 28,
wherein, in generating the modified array of coefficients, the processor is operable to set coefficients of the modified array equal to zero at positions other than coefficient positions of the points in the trajectory.

36. The system of claim 35,
wherein, in generating the modified array of coefficients, the processor is further operable to set coefficients of the modified array equal to coefficients of the first array at coefficient positions of the points in the trajectory.

37. The system of claim 28, further comprising:
a display device coupled to the processor;
wherein the processor is further operable to execute the analysis software to display a visual representation of the first array of coefficients on the display device;
wherein said processor executing the analysis software to receive user input selecting the plurality of points from the first array of coefficients comprises receiving user input to the visual representation of the first array of coefficients.

38. The system of claim 28,
wherein the presentation device comprises at least one speaker;
wherein said presentation device presenting the time domain signal to the user comprises the at least one speaker audially presenting the time domain signal as sound output.

39. The system of claim 28,
wherein the presentation device comprises a display;
wherein said presentation device presenting the time domain signal to the user comprises the display visually displaying the time domain signal.

40. The system of claim 28,
wherein, in generating the time domain signal from the modified array of coefficients, the processor is operable to perform an inverse joint time-frequency transform on the modified array of coefficients.

41. The system of claim 28,
wherein, in performing the invertible joint time-frequency transform on the samples of the input signal, the processor is operable to perform a Gabor transform.

42. A memory medium for analyzing an input signal, the memory medium comprising program instructions executable to:
receive samples of the input signal, wherein the input signal is sampled in time;
perform an invertible joint time-frequency transform on the samples of the input signal to produce a first array of coefficients which depend on time and frequency;
receive user input selecting a plurality of points from the first array of coefficients, wherein the points are proximate to an order component present in the first array of coefficients;
determine a trajectory of the order component based on the selected points, wherein the trajectory comprises a subset of the points from the first array of coefficients;
generate a modified array of coefficients based on the trajectory;
generate a time domain signal from the modified array of coefficients; and
present the time domain signal to a user on a presentation device;
wherein the time domain signal is useable in analyzing information present in the signal.

43. The memory medium of claim 42,
wherein the input signal is acquired from a physical system having a rotating element;
wherein the time domain signal is useable in analyzing the physical system having the rotating element.

44. The method of claim 43,
wherein said receiving samples of the input signal does not include receiving rotation speed information indicating rotation speed of the rotating element;
wherein the memory medium comprises program instructions executable to analyze the input signal without rotation speed information.

45. The memory medium of claim 44, wherein said determining the trajectory of the order component based on the selected points comprises:
estimating a trajectory of the order component based on the selected points, wherein the estimated trajectory comprises one or more line segments connecting the selected points; and
determining the actual trajectory of the order component based on the estimated trajectory of the order component.

46. The memory medium of claim 45, wherein said determining the actual trajectory of the order component based on the estimated trajectory of the order component comprises:
determining a band of points from the first array of coefficients proximate to the estimated trajectory of the order component; and
determining coefficient positions having peak values within the band, wherein the coefficient positions having peak values define the actual trajectory of the order component.

47. The memory medium of claim 46,
wherein the width of the band is determined automatically based on the first array of coefficients.

48. The memory medium of claim 46,
wherein the width of the band is determined based on user input specifying a desired width.

49. The memory medium of claim 42,
wherein said generating the modified array of coefficients comprises setting coefficients of the modified array equal to zero at positions other than coefficient positions of the points in the trajectory.

50. The memory medium of claim 49,
wherein said generating the modified array of coefficients further comprises setting coefficients of the modified array equal to coefficients of the first array at coefficient positions of the points in the trajectory.

51. The memory medium of claim 42, further comprising program instructions executable to:
display a visual representation of the first array of coefficients;
wherein said receiving user input selecting a plurality of points from the first array of coefficients comprises receiving user input to the visual representation of the first array of coefficients.

52. The memory medium of claim 42,
wherein the presentation device comprises at least one speaker;
wherein said presenting the time domain signal to the user on the presentation device comprises audially presenting the time domain signal as sound output from the at least one speaker.

53. The memory medium of claim 42,
wherein the presentation device comprises a display;
wherein said presenting the time domain signal to the user on the presentation device comprises visually displaying the time domain signal on the display.

54. The memory medium of claim 42, wherein said generating the time domain signal from the modified array of coefficients comprises performing an inverse joint time-frequency transform on the modified array of coefficients.

55. The memory medium of claim 42, wherein the joint time-frequency transform comprises the Gabor transform.

56. The memory medium of claim 42, wherein the input signal comprises a signal generated by a microphone proximate to a mechanical system.

* * * * *